(12) United States Patent
Sato et al.

(10) Patent No.: US 6,862,006 B2
(45) Date of Patent: Mar. 1, 2005

(54) IMAGE PROCESSING APPARATUS AND IMAGE PROCESSING METHOD, AND IMAGE PROCESSING PROGRAM AND RECORDING MEDIUM OF THE SAME

(75) Inventors: Shigemi Sato, Nagano-ken (JP); Akira Kubota, Matsumoto (JP)

(73) Assignee: Seiko Epson Corporation (JP)

( * ) Notice: Subject to any disclaimer, the term of this patent is extended or adjusted under 35 U.S.C. 154(b) by 98 days.

(21) Appl. No.: 10/436,504

(22) Filed: May 12, 2003

(65) Prior Publication Data

US 2003/0234823 A1 Dec. 25, 2003

(30) Foreign Application Priority Data

May 17, 2002 (JP) ...................................... 2002-143906

(51) Int. Cl.$^7$ ................................................. G09G 5/00
(52) U.S. Cl. ............................................... 345/8; 345/9
(58) Field of Search ........................... 345/7, 8, 9, 156, 345/157, 158, 633

(56) References Cited

U.S. PATENT DOCUMENTS 6,346,929 B1 * 2/2002 Fukushima et al. ............ 345/8
6,549,641 B2 * 4/2003 Ishikawa et al. ............ 382/103

FOREIGN PATENT DOCUMENTS

JP          06-282371         10/1994

* cited by examiner

Primary Examiner—Matthew Luu
(74) Attorney, Agent, or Firm—Harness, Dickey & Pierce, P.L.C.

(57) ABSTRACT

An image processing apparatus and an image processing method are provided which are capable of changing display from a virtual space image to a real space image or vice versa, or combining them based on the movement speed of the user's point of gaze while the user is moving in a virtual space. An image processing program and a medium recording the same are also provided. In the image processing apparatus, when the movement of a head mounted display (HMD) in the virtual space is detected (Step S111), the movement speed is calculated (Step S112) and it is determined whether the movement speed is equal to or greater than akm/h. When the movement speed is slower than akm/h, an updated virtual space image reflecting the movement of the HMD is created for display (Steps S114 and S118). When the movement speed is equal to or greater than akm/h, the real image then being taken is displayed as it is (Steps S115 and S118).

35 Claims, 20 Drawing Sheets

IMAGE PROCESSING APPARATUS AND IMAGE PROCESSING METHOD, AND IMAGE PROCESSING PROGRAM AND RECORDING MEDIUM OF THE SAME

BACKGROUND OF THE INVENTION

1. Field of the Invention

The invention relates to an image processing apparatus and an image processing method, more specifically to an image processing apparatus and an image processing method in which a virtual space image and a real space image are changed or combined for display when a user moves in the virtual space image, and an image processing program and a recording medium of the same.

2. Related Art

JP-A-H06-282371 discloses a virtual space desktop apparatus, in which a virtual space image of a book is displayed, a user (reader) turns a page of the displayed virtual book, and then the page of the book can be turned according to the user's motions.

However, the user cannot feel the textures of pages of the book by hand or finger in the above conventional apparatus; for example, the user cannot feel the touch when contacting with the edge of the page, or the reaction force when holding the book by hand or fingers, and thus the user feels odd.

Additionally, in turning the page of a book, it is the natural motion that the edge of the page of the book is sensed by finger touch and the page is caught and lifted by fingers to turn the page. However, the conventional apparatus cannot give the feel of the book to hand or finger. Thus, every time the page of the book is turned, the motions are needed that the user must look at the edge of the page of the book while moving the fingers there, requiring a lot of effort and time to turn the page of the book.

When a virtual image is superimposed on a real image and is displayed as a virtual space image, there is a problem that it is difficult for the user to know whether the image in the virtual space is real or virtual. In this case, when the user moves in the virtual space, real things become obstacles and dangerous to the user. On the other hand, movement to avoid hitting each virtual object is troublesome.

The object of the invention is to provide an image processing apparatus and an image processing method capable of changing a virtual space image and a real space image or combining them based on the speed of a user's point of gaze when a user moves in a virtual space, and an image processing program and a recording medium of the same.

SUMMARY

The object of the invention is achieved by following (1) to (35).

(1) An image processing apparatus having:

an image pickup unit adapted to take an image in real space seen from a user's point of gaze;

an image creating unit adapted to create a virtual space image corresponding to a real space image taken by the image pickup unit;

a display unit adapted to display the real space image taken by the image pickup unit and the virtual space image created by the image creating unit;

a speed detecting unit adapted to detect the speed of movement of the user's point of gaze; and a display control unit adapted to change at least a part of an image to be displayed on the display unit from the real space image to the virtual space image or vice versa, based on the movement speed detected by the speed detecting unit.

(2) The image processing apparatus as in (1), wherein the display control unit changes the image to be displayed from the real space image to the virtual space image or from the virtual space image to the real space image when the movement speed detected by the speed detecting unit is greater than a predetermined value.

(3) An image processing apparatus having:

an image pickup unit adapted to take an image in real space seen from a user's point of gaze;

an image creating unit adapted to create a virtual space image corresponding to the real space image taken by the image pickup unit;

a display unit adapted to display the real space image taken by the image pickup unit and the virtual space image created by the image creating unit;

a speed detecting unit adapted to detect the speed of the user's point of gaze; and a display control unit adapted to change the display ratio of the real space image and the virtual space image based on the movement speed detected by the speed detecting unit and thus combine these images for display.

(4) The image processing apparatus as in (3), wherein the display control unit causes the display unit to display the virtual space image when the movement speed detected by the speed detecting unit is smaller than a first threshold value, causes the display unit to display the real space image when the movement speed is greater than a second threshold value, and it changes the ratio of the real space image and the ratio of the virtual space image, combines the images and allows the display unit to display the combined image based on a magnitude of the movement speed when the movement speed is between the first threshold value and the second threshold value.

(5) The image processing apparatus as in (3) or (4) further having:

a finger position detecting unit adapted to detect a finger position; and a tactile and kinesthetic sensation presenting unit having a tactile and kinesthetic sensation generating unit adapted to generate and give a tactile and kinesthetic sensation to a finger when the finger position detected by the finger position detecting unit matches the position of a virtual object displayed in the virtual space image, wherein the image creating unit creates a virtual finger image at the finger position detected by the finger position detecting unit in the virtual space image, and the display unit displays the virtual space image including the virtual finger image.

(6) The image processing apparatus as in (4), further comprising:

a finger position detecting unit adapted to detect a finger position;

a tactile and kinesthetic sensation presenting unit having a tactile and kinesthetic sensation generating unit adapted to generate and give a tactile and kinesthetic sensation to a finger when the finger position detected by the finger position detecting unit matches the position of a virtual object displayed in the virtual space image; and a drive control unit adapted to control drive of the tactile and kinesthetic sensation generating unit so that a finger pad receives a sensation corresponding to contact when the finger position detected by the finger position detecting unit matches the position of the virtual object displayed in the virtual space image in the case where the movement speed is between the first threshold value and the second threshold value, wherein the image creating unit creates a virtual finger image at the finger position detected by the finger position detecting unit in the virtual space image, and the display unit displays the virtual space image including the virtual finger image.

(7) The image processing apparatus as in (4) further having:

a finger position detecting unit adapted to detect a finger position;

a tactile and kinesthetic sensation presenting unit having a tactile and kinesthetic sensation generating unit adapted to generate and give a tactile and kinesthetic sensation to a finger when the finger position detected by the finger position detecting unit matches the position of a virtual object displayed in the virtual space image; and a drive control unit adapted to control drive of the tactile and kinesthetic sensation generating unit so that a finger pad does not receive a sensation corresponding to contact even when the finger position detected by the finger position detecting unit matches the position of the virtual object displayed in the virtual space image in the case where the movement speed is between the first threshold value and the second threshold value, wherein the image creating unit creates a virtual finger image at the finger position detected by the finger position detecting unit in the virtual space image, and the display unit displays the virtual space image including the virtual finger image.

(8) The image processing apparatus as in any one of (1) to (7), wherein the image pickup unit has two CCD cameras corresponding to the user's point of gaze.

(9) The image processing apparatus as in any one of (1) to (8), wherein the image creating unit updates and creates the virtual space image at predetermined time intervals based on the movement speed of the user's point of gaze detected by the speed detecting unit.

(10) The image processing apparatus as in any one of (1) to (9), wherein the display unit has a position detecting unit adapted to detect the position of the user's point of gaze, and the speed detecting unit includes an operating unit adapted to calculate the speed of the user's point of gaze from the positions of the user's point of gaze detected by the position detecting unit and the time required to move between positions.

(11) The image processing apparatus as in (10), wherein the position detecting unit is a position detecting unit of an orthogonal coil system having a first coil, a second coil and a third coil, and their central axes orthogonal to each other.

(12) The image processing apparatus as in (10), wherein the finger position detecting unit has gyro sensors for detecting an angular velocity about X-, Y- and Z-axes orthogonal to each other.

(13) The image processing apparatus as in any one of (1) to (9), wherein the speed detecting unit has:

a three-dimensional acceleration sensor for detecting acceleration in three directions orthogonal to each other, and an operating unit adapted to calculate the speed by integrating or adding the output of the acceleration sensor.

(14) The image processing apparatus as in any one of (1) to (13), wherein the display unit is a product to be worn on a face for use.

(15) The image processing apparatus as in any one of (1) to (14), wherein the display unit and the image pickup unit are configured as one unit, which further has at least one of:

an image creating unit;

a speed detecting unit;

a display control unit; and a drive control unit; and a communication unit adapted to send and receive real image data, virtual space image data, position data, and/or drive control data.

(16) The image processing apparatus as in any one of (1) to (15) further having at least one of a storing unit adapted to store real space image data taken by the image pickup unit, virtual space image data created by the image creating unit, movement speed detected by the speed detecting unit, and position data detected by the position detecting unit.

(17) An image processing method comprising the steps of:

taking an image in real space seen from a user's point of gaze;

creating a virtual space image corresponding to the taken real space image;

displaying at least one of the real space image or the created virtual space image;

detecting the speed of the user's point of gaze; and changing at least a part of the image to be displayed from real space image to virtual space image or vice versa for display, based on the detected movement speed.

(18) The image processing method as in (17), wherein the changing and displaying step changes the image to be displayed from the real space image to the virtual space image or from the virtual space image to the real space image when the detected movement speed is greater than a predetermined value.

(19) An image processing method comprising the steps of:

taking an image in real space seen from a user's point of gaze;

creating a virtual space image corresponding to the taken real space image;

displaying at least one of the taken real space image or the created virtual space image;

detecting the speed of the user's point of gaze; and changing the display ratio of the real space image and the virtual space image based on the detected movement speed and combining them for display.

(20) The image processing method as in (19), wherein the combining and displaying step causes the virtual space image to be displayed when the movement speed of the user's point of gaze is smaller than a first threshold value, and causes the real space image to be displayed when the movement speed is greater than a second threshold value, and changes the display ratio of the real space image and the virtual space image based on the movement speed and combines them for display when the movement speed is between the first threshold value and the second threshold value.

(21) The image processing method as in (19) or (20), further comprising the steps of:

detecting a finger position and displaying a finger image in the virtual space, and generating a tactile and kinesthetic sensation in a finger when the detected finger position matches a position of a virtual object displayed in the virtual space.

(22) The image processing method as in (20), further comprising the steps of:

detecting finger position and displaying a finger image in the virtual space image, generating a tactile and kinesthetic sensation in a finger when the detected finger position matches the position of a virtual object displayed in the virtual space image, and controlling the generation of the tactile sense and the kinesthetic sense so that a finger pad can receive a sensation corresponding to contact when the detected finger position matches the position of the virtual object displayed in the virtual space image in the case where the movement speed is between the first threshold value and the second threshold value.

(23) The image processing method as in (20) further comprising the steps of:

detecting a finger position and displaying a finger image in the virtual space image;

generating a tactile and kinesthetic sensation in a finger when the detected finger position matches a position of a virtual object displayed in the virtual space image; and controlling the generation of the tactile sense and the kinesthetic sense so that a finger pad does not receive a sensation corresponding to contact even when the detected finger position matches the position of the virtual object displayed in the virtual space image in the case where the movement speed is between the first threshold value and the second threshold value.

(24) The image processing method as in any one of (17) to (23) further comprising the step of detecting the position of the user's point of gaze before the speed detecting step, wherein the speed detecting step includes the step of calculating the speed of the user's point of gaze based on the different detected positions of the user's point of gaze and the time required to move between different positions.

(25) The image processing method as in any one of (17) to (23), wherein the speed detecting step includes the step of detecting acceleration of the user's point of gaze and integrating or adding the acceleration to calculate the speed.

(26) An image processing program for an information processing device for creating a virtual space image and displaying the virtual space image so as to be visually recognizable by a user, the program making the computer of the information processing device to function as:

image pickup means for taking an image in real space seen from a user's point of gaze;

image creating means for creating a virtual space image corresponding to a real space image taken by the image pickup means;

display means for displaying the real space image taken by the image pickup means and the virtual space image created by the image creating means;

speed detecting means for detecting the speed of the user's point of gaze; and display controlling means for changing at least a part of an image to be displayed on the displaying means from the real space image to the virtual space image or vice versa based on the movement speed detected by the speed detecting means.

(27) The image processing program as in (26), wherein the display controlling means includes a program code changing the image to be displayed from the real space image to the virtual space image or from the virtual space image to the real space image when the movement speed detected by the speed detecting means is greater than a predetermined value.

(28) An image processing program for an information processing device for creating and displaying the virtual space image so as to be visually recognizable by a user, the program making the computer of the information processing device to function as:

image pickup means for taking an image in real space seen from a user's point of gaze;

image creating means for creating a virtual space image corresponding to the real space image taken by the image pickup means;

display means for displaying the real space image taken by the image pickup means and the virtual space image created by the image creating means;

speed detecting means for detecting the speed of the user's point of gaze; and display controlling means for changing the display ratio of the real space image and the virtual space image based on the movement speed detected by the speed detecting means and combining them for display.

(29) The image processing program as in (28), wherein the display controlling means includes a program code for displaying means to display the virtual space image when the movement speed detected by the speed detecting means is smaller than a first threshold value, to display the real space image when the movement speed is greater than a second threshold value, and to change the display ratio of the real space image and the virtual space image based on the movement speed, to combine the images and make the displaying means to display the combined image when the movement speed is between the first threshold value and the second threshold value.

(30) The image processing program as in (28) or (29) further having a program code making the computer of the information processing device to function as:

finger position detecting means for detecting a finger position;

finger displaying means for displaying a finger image at the finger position detected by the finger position detecting means in the virtual space image; and tactile and kinesthetic sensation generating means for generating a tactile and kinesthetic sensation in a finger when the finger position detected by the finger position detecting means matches the position of a virtual object displayed in the virtual space.

(31) The image processing program as in (29) further has a program code making the computer of the information processing device to function as:

finger position detecting means for detecting a finger position;

finger displaying means for displaying a finger image at the finger position detected by the finger position detecting means in the virtual space;

tactile and kinesthetic sensation generating means for generating a tactile and kinesthetic sensation in a finger when the finger position detected by the finger position detecting means matches the position of a virtual object displayed in the virtual space image; and drive controlling means for controlling the generation of the tactile sense and the kinesthetic sense so that a finger pad can receive a sensation corresponding to contact when the finger position detected by the finger position detecting means matches the position of the virtual object displayed in the virtual space image in the case where the movement speed is between the first threshold value and the second threshold value.

(32) The image processing program as in (29) further having a program code making the computer of the information processing device to function as:

finger position detecting means for detecting a finger position;

finger displaying means for displaying a finger image at the finger position detected by the finger position detecting means in the virtual space;

tactile and kinesthetic sensation generating means for generating a tactile and kinesthetic sensation in a finger when the finger position detected by the finger position detecting means matches the position of a virtual object displayed in the virtual space; and drive controlling means for controlling the generation of the tactile sense and the kinesthetic sense so that a finger pad cannot receive a sensation corresponding to a contact even when the detected finger position matches the position of the virtual object displayed in the virtual space image in the case where the movement speed is between the first threshold value and the second threshold value.

(33) The image processing program as in any one of (26) to (32) further has a program code making the computer of the information processing device to function as position detecting means for detecting the position of the user's point of gaze, wherein the speed detecting means includes a program code for calculating the speed of the user's point of gaze based on the different positions of the user's point of gaze detected by the position detecting means and the time required to move between these detected positions.

(34) The image processing program as in any one of (26) to (32), wherein the speed detecting means includes a program code for detecting acceleration of the user's point of gaze and integrating or adding the acceleration to calculate the speed.

(35) A recording medium recording the image processing program according to any one of (26) to (34) so that a computer can execute it, and the recording medium being readable by the computer.

DETAILED DESCRIPTION

Hereafter, preferred embodiments of the image processing apparatus and the image processing method of the invention will be described in detail with reference to FIGS. 1 to 20. However, the embodiments will be described as examples, and the invention must not be interpreted in a limited way by such embodiments.

Figure 1:
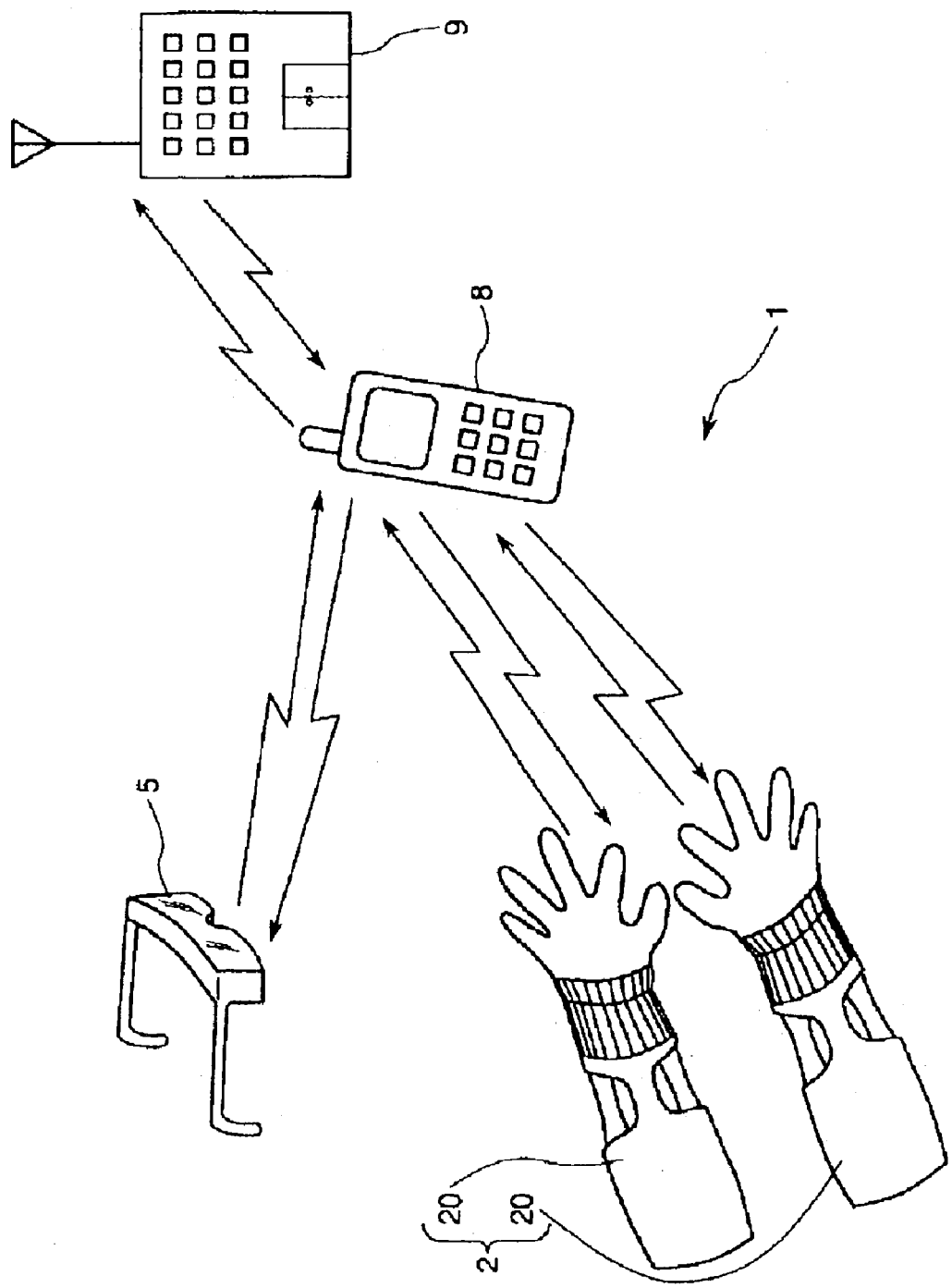
FIG. 1 is a conceptual diagram illustrating the first embodiment of the tactile and kinesthetic sensation generating device of the invention and a configuration of the image processing apparatus containing the tactile and kinesthetic sensation generating device.
Figure 2:
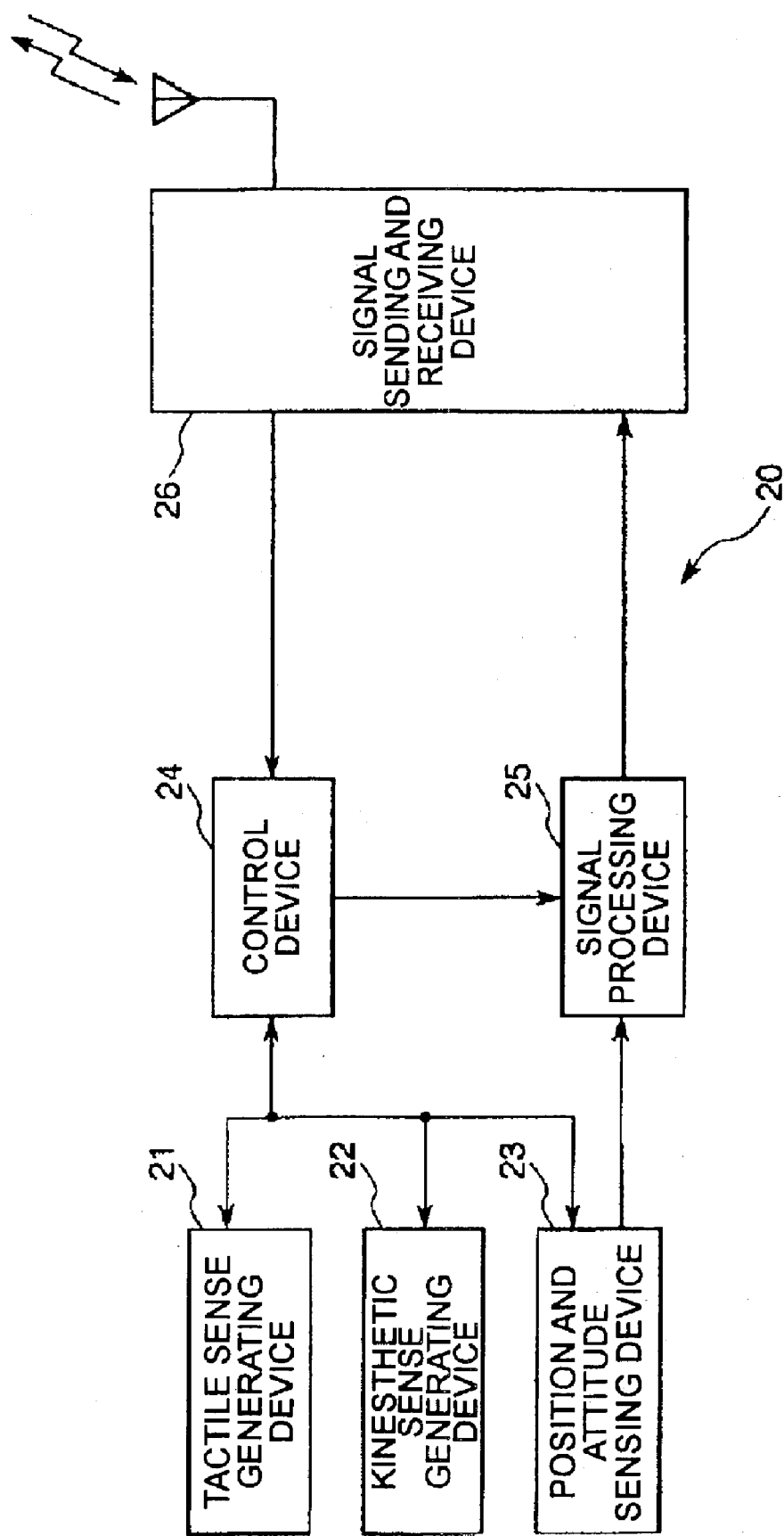
FIG. 2 is a block diagram illustrating a circuit configuration of the real space glove shown in FIG. 1.
Figure 3:
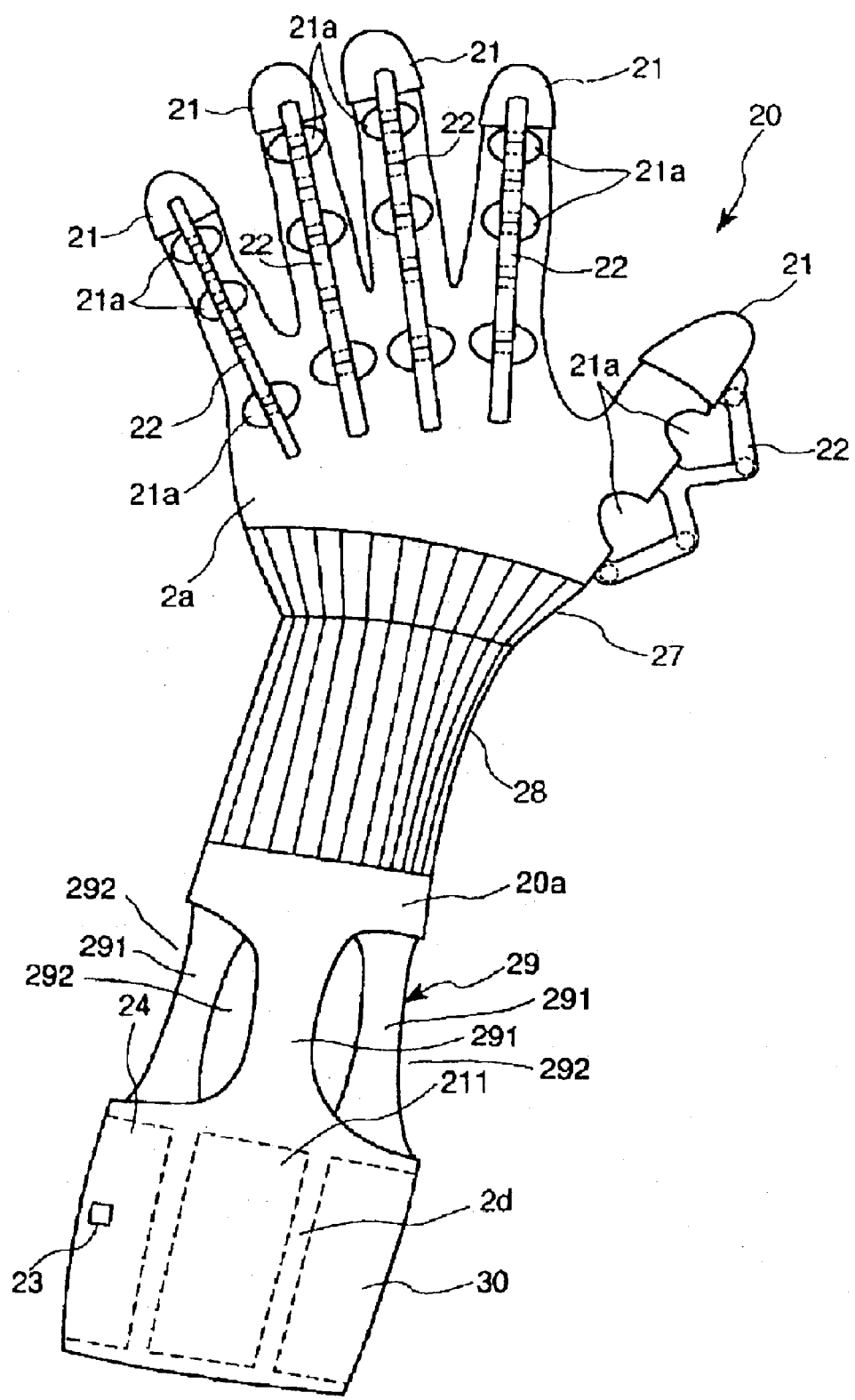
FIG. 3 is an external view illustrating the exemplary configuration of the appearance of the real space glove shown in FIG. 1 (some parts are omitted)

FIG. 1 is a conceptual diagram illustrating the exemplary configuration of a first embodiment of the image processing apparatus including a tactile and kinesthetic sensation generating device of the invention. FIG. 2 is a block diagram illustrating the exemplary circuit configuration of a real space glove 20 shown in FIG. 1. Moreover, FIG. 3 is an external view illustrating the exemplary configuration of the appearance of the real space glove 20 shown in FIG. 1 (descriptions are omitted partially).

Figure 19:
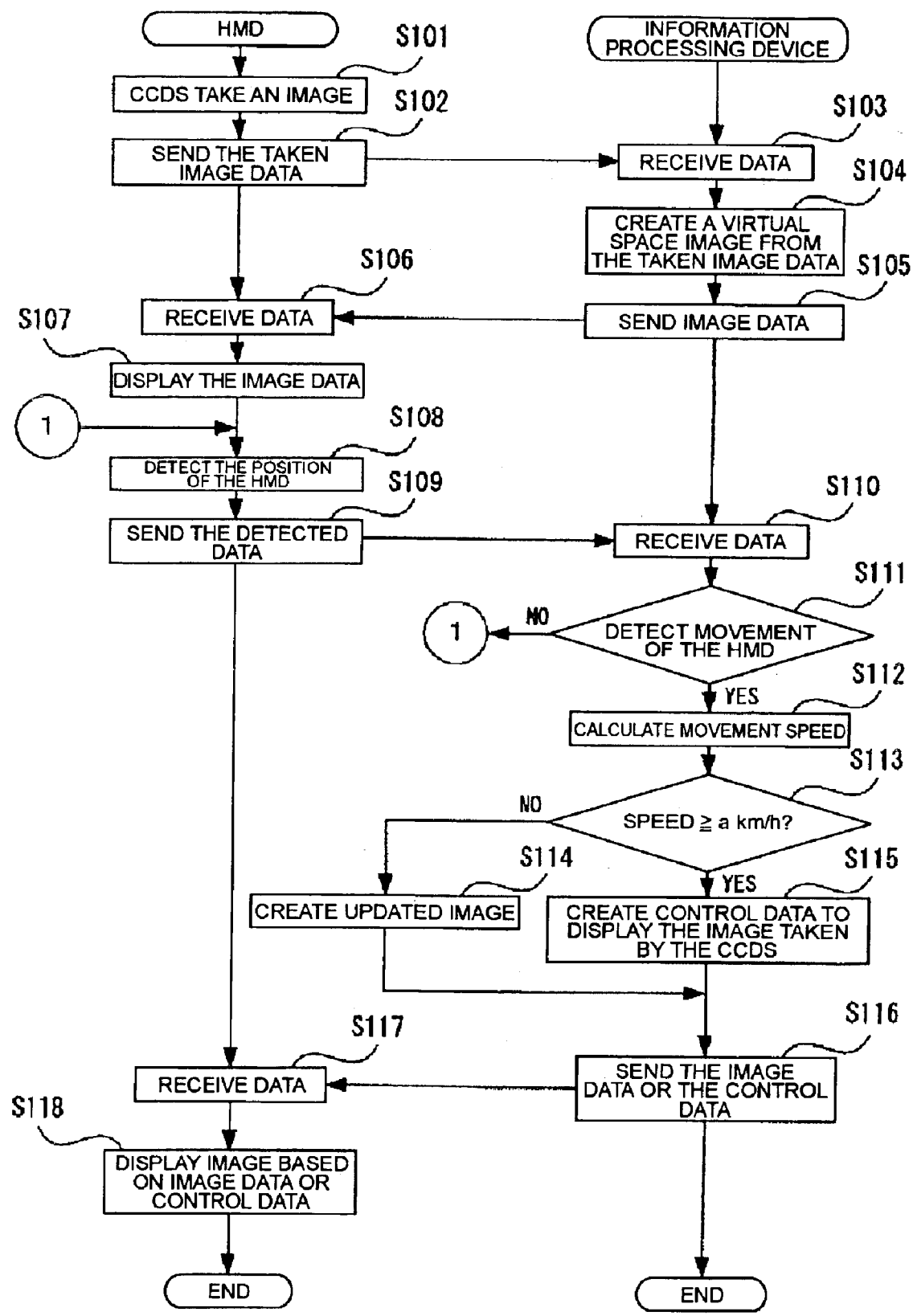
FIG. 19 is a flowchart illustrating the display image changing process in the image processing apparatus of the invention.
Figure 20:
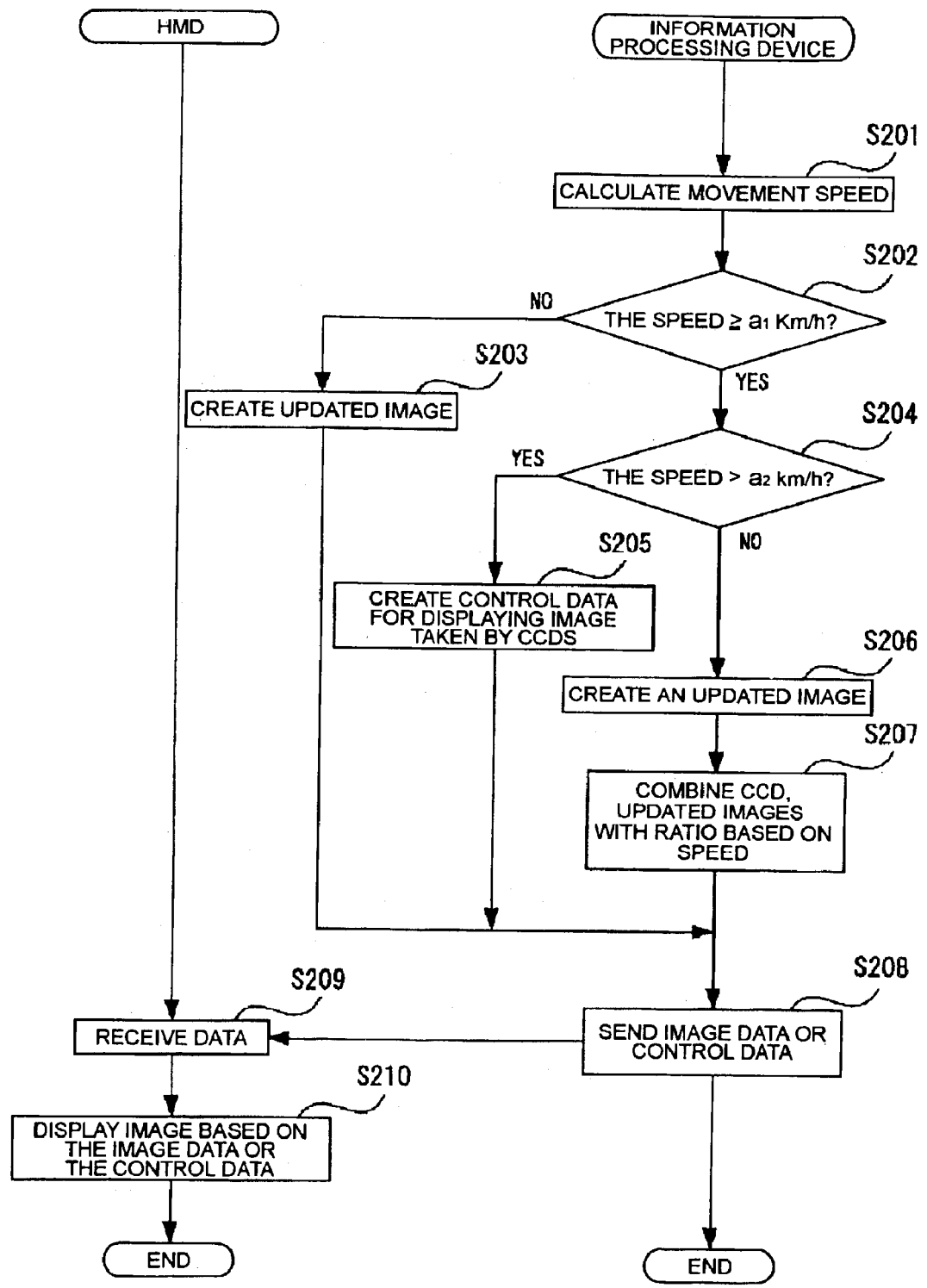
FIG. 20 is a flowchart illustrating the display image combination process in the image processing apparatus of the invention.

As shown in FIG. 1, an image processing apparatus 1 is provided with a pair of real space gloves (data gloves) 20 and 20 worn on hands (fingers) of a user (wearer) for giving a tactile sense (a sense of touch: the distribution of contact strength such as texture, shapes and strength) and a kinesthetic sense (a sensation of force applied when touching), a virtual space display device (display unit) 5 for displaying virtual space images (virtual space video), an information processing device 8 for performing various processes such as drive control of each real space glove 20 and the virtual space display device 5 (processes such as a display image changing process illustrated in FIG. 19 and a display image combination process illustrated in FIG. 20 in the invention, both processes described later), and a base station 9 for creating the virtual space images and providing various services using the virtual space image.

Each real space glove 20, the virtual space display device 5, the information processing device 8 and the base station 9 has a wireless communication function (wireless communication unit) capable of sending and receiving signals by radio (wireless communication, for example, wireless LAN (Local Area Network), infrared (IR) data communication (IrDA: Infrared Data Association), and Bluetooth). The information processing device 8 can communicate with each real space glove 20, the virtual space display device 5 and the base station 9.

The image processing apparatus 1 performs processes in which the virtual space image produced by the information processing device 8 based on information fed by the base station 9, the virtual space display device 5 and each real space glove 20 is displayed on the virtual space display device 5, and when the hand and fingers wearing the real space glove 20 are moved to virtually contact with an object displayed in the virtual space, that contact is displayed on the virtual space display device 5 and the image processing apparatus 1 performs processes to give tactile and kinesthetic sensation of contact to the hand and each of the fingers wearing the real space glove 20.

For example, the information processing device 8 is configured of various devices provided with the wireless communication function (communication unit) and a control function (control unit), such as a mobile phone terminal, a personal computer having the wireless communication function, and a portable information device called PDA (Personal Digital Assistant).

Furthermore, for example, the base station 9 is configured of various devices for providing information about the virtual space image, such as various server computers connected to the Internet and the base station of mobile phones for wireless communication with the mobile phone terminals.

In the embodiment, the real space glove 20, the virtual space display device 5, the information processing device 8 and the base station 9 are all configured to have the wireless communication function, but for example, it is acceptable that some or all of them are configured to perform wired communications.

The information processing device 8 may have some or all of the functions of the base station 9. In the later-described display image changing process illustrated in FIG. 19 and display image combination process illustrated in FIG. 20, all the functions of the base station 9 are included in the information processing device 8 for convenience.

In addition, it is acceptable that the real space glove 20 has some or all of the functions of the virtual space display device 5, the information processing device 8 and the base station 9.

In the embodiment, the tactile and kinesthetic sensation generating device 2 is configured of the pair of the real space gloves 20 and 20; more specifically, the left-hand real space glove 20 to be worn on the user's left hand and the right-hand real space glove 20 to be worn on the user's right hand. In the description below, one of the real space gloves 20 will be described as representative of both.

Moreover, in the invention, it is acceptable to configure the tactile and kinesthetic sensation generating device 2 with only one real space glove 20.

In the invention, it is acceptable that the tactile and kinesthetic sensation generating device 2 has one or two, or all of the followings in addition to the real space glove 20: virtual space display device 5, information processing device 8, and base station 9. In this case, it is acceptable that the tactile and kinesthetic sensation generating device 2 has some or all of these functions.

As shown in FIG. 2, the real space glove 20 has: 1) a tactile sense generating device (tactile sense generating unit) 21 for generating sensation in fingers (for example, the distribution of contact strength conveying such as texture, shapes, strength, etc.) when a contact has been made with a thing appearing in the virtual space (an object on the virtual space image); 2) a kinesthetic sense generating device (kinesthetic sense generating unit) 22 for generating the sensation of force in the hands and fingers when contact has been made with something appearing in the virtual space; 3) a position and attitude sensing device 23 for sensing the positions of the different parts of the real space glove 20 (the different positions of the parts of the hand, wrist, arm and fingers wearing the real space glove 20); 4) a control device 24 for controlling the different parts of the real space glove 20; 5) a signal processing device 25 for amplifying and other processing of detected data signals to be sent to the information processing device 8; 6) and a signal sending and receiving device (communication unit) 26 for wireless communications with the information processing device 8.

As shown in FIG. 3, the whole appearance of the real space glove 20 is that of an elbow-length glove (glove shape). More specifically, the real space glove 20 comprises a relatively long glove 2a with a sleeve part 20a covering the arm from the fingers to near the elbow of the wearer (user) serving as a glove-shaped device-attachment means.

The user can easily and properly put on and take off the devices of the real space glove 20 because they are on the glove 2a.

The glove 2a is worn from the hand to the elbow of the user, thus the motions (manipulation) in the virtual space can be performed easily and accurately.

The glove 2a is provided with a looseness absorbing part 27 for taking up the looseness of the portions of the glove at the fingertips, a wrist fixing part 28 for fixing the real space glove 20 to the wrist, an arm fixing part 2d for fixing the real space glove 20 to the arm, and a twist absorbing part 29 for absorbing the twist of the portion corresponding to the arm.

The looseness absorbing part 27 is disposed at the portion near the wrist of the glove 2a. The looseness absorbing part 27 is formed of an elastic substance such as any type of rubber.

When the user wears the real space glove 20, the glove 2a is pulled in the elbow direction (base end side) by the restoring force (elastic force) of the looseness absorbing part 27 to keep the glove on the hand. Therefore, looseness at the fingertips can be prevented or suppressed.

In addition, in the case where a plurality of users have different sizes of hands and different lengths of fingers, the looseness absorbing part 27 also can prevent or suppress the looseness from being generated in all their fingertips.

The wrist fixing part 28 is disposed next to the looseness absorbing part 27 on the side toward the elbow (base end side). The wrist fixing part 28 is formed of an elastic body such as any type of rubber.

When the user wears the real space glove 20, the glove 2a is fixed to the wrist by the restoring force (elastic force) of the wrist fixing part 28. Therefore, the real space glove 20 can be prevented from slipping off in use.

Furthermore, the wrist fixing part 28 and the looseness absorbing part 27 allow a bundle 212a of actuator wires 212 of the tactile sense generating device 21, which will be described later, to be kept in a predetermined position so that the actuator wires 212 can move in the each longitudinal direction.

The arm fixing part 2d is disposed at the elbow end (base end side) of the sleeve part 20a of the glove 2a. The arm fixing part 2d is formed of an elastic body such as any type of rubber.

When the user wears the real space glove 20, the glove 2a is fixed to the arm by the restoring force (elastic force) of the arm fixing part 2d. Therefore, the real space glove 20 can be prevented from slipping off in use.

The twist absorbing part 29 is disposed midway in the sleeve part 20a of the glove 2a; that is, disposed between the wrist fixing part 28 and the arm fixing part 2d.

The twist absorbing part 29 is configured of three band parts 291 obtained by forming three openings 292 in the sleeve part 20a. Each of the band parts 291 is formed of an elastic member such as cloth formed of elastic materials.

When the user wears the real space glove 20 and twists the wrist, for example, each of the band parts 291 is expanded or contracted and deformed to absorb the twist of the sleeve part 20a.

In this manner, the twist absorbing part 29 can prevent the real space glove 20 from being twisted, and thus the user can move the hand and arm easily and smoothly.

It is acceptable that the number of the band parts 291 of the twist absorbing part 29 is two or less, or four or more.

An opening 21a is formed on the portions of the glove 2a corresponding to the back side of each joint of all fingers.

These openings 21a allow the user to move each joint of all fingers easily and smoothly.

In addition, in the real space glove 20, the control device 24, an electric power supply device 30 and a power generating device 211 are disposed in the portion corresponding to the arm of the glove 2a, located on the elbow side of the twist absorbing part 29, that is, in the end portion (base end side) of the sleeve part 20a of the glove 2a, which is close to the elbow.

The control device 24, the electric power supply device 30 and the power generating device 211 are disposed as described above, and thus the weight on the fingertip side (tip end side) of the real space glove 20 can be reduced (the inertia can be reduced). Accordingly, the user can move (manipulate) easily.

The main part of the tactile sense generating device 21 is disposed on the position covering the fingertip from the distal interphalangeal joint (the joint between the distal phalanx and the middle phalanx) of each finger of the user when the user wears the real space glove 20. In addition, the configuration and operation of each of the tactile sense generating devices 21 are almost the same, and thus one of them will be typically described below.

FIG. 4 gives longitudinal sectional views illustrating the exemplary configuration of the tactile sense generating device 21. To avoid the complexity of the drawing, the thickness of the members is partially omitted for illustration in the drawing.

Figure 4A:
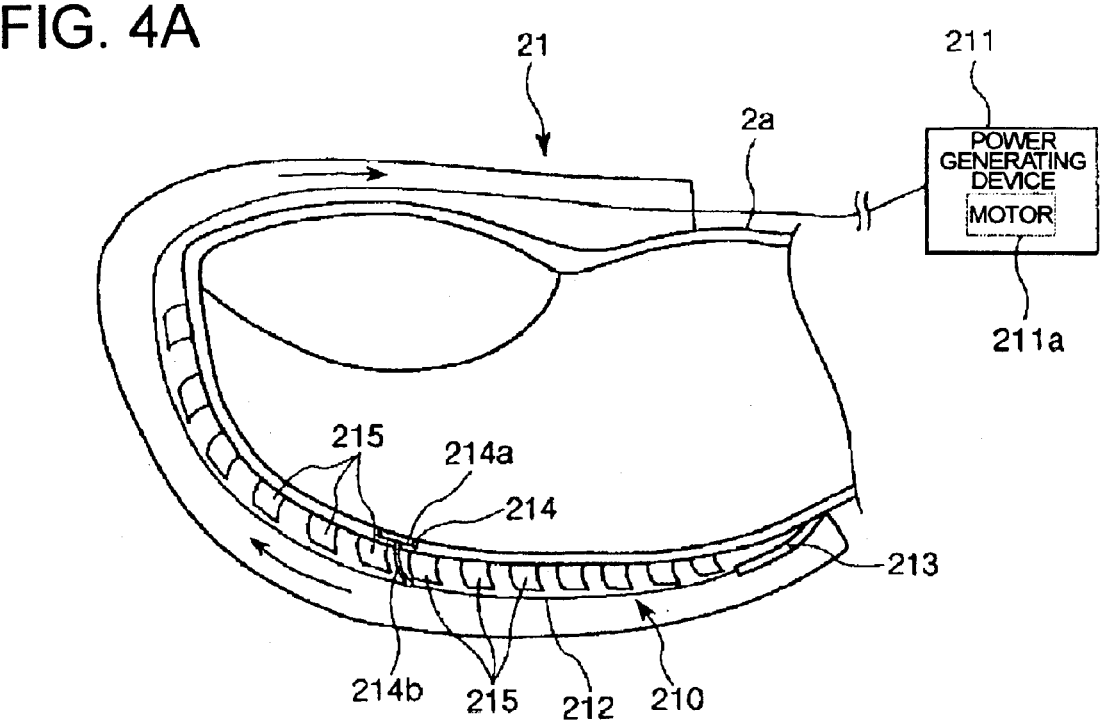
FIGS. 4A–4C give cross sectional views illustrating a configuration of the tactile sense generating device of the real space glove shown in FIG. 1.

As shown in FIG. 4A, the tactile sense generating device 21 has the power generating device (transport unit) 211 provided with a motor (power source) 211a, an actuator wire (wire having flexibility) 212 movably disposed in the longitudinal direction, a wire holding part (force applying unit) 213 for holding one end of the actuator wire 212, a tactile sense presenting pin (pressing part) 214 for pressing the finger pad to generate a tactile sense, and a tactile sense presenting pin supporting part (moving direction control unit) 215 for supporting the tactile sense presenting pin 214 and for controlling the moving direction of the tactile sense presenting pin 214. And all of them constitute a plurality of unit tactile sense generating devices (actuators) 210. Each of the unit tactile sense generating sub-devices 210 is independent each other.

In addition, a drive mechanism for driving the tactile sense presenting pin 214 is configured of the power generating device 211, the actuator wire 212 and the tactile sense presenting pin supporting part 215.

For example, the power generating device 211 drives the rotating motor 211a, which is disposed inside, in accordance with control signals from the control device 24, and performs the process of reeling the actuator wire 212 by the rotation of the motor 211a (the process of moving the actuator wire 212 in its longitudinal direction 212). The control device 24 controls the power generating device 211 in accordance with the order from the information processing device 8 so that the motor 211a is rotated at a predetermined torque for a predetermined period of time. The power generating device 211 gives rotation power to the motor 211a in accordance with the order from the information processing device 8, and thus performs the process of reeling the actuator wire 212 for a predetermined length.

As shown in FIG. 4A, the wire holding part 213 holds one end of the actuator wire 212 (terminal end) near the distal interphalangeal joint in the embodiment. The wire holding part 213 is configured of a member having elasticity (elastic body) such as rubbers and springs.

Accordingly, the motor 211a is driven by the power generating device 211 to reel the actuator wire 212, and then the actuator wire 212 is moved clockwise in FIG. 4A. Thus, the wire holding part 213 is extended, and the actuator wire 212 is given a tension of counter-clockwise in FIG. 4A (the direction inverse to the moving direction of the actuator wire 212 when the tactile sense presenting pin 214 is projected) by the restoring force (elastic force) of the wire holding part 213. Then, the motor 211a is stopped by the power generating device 211, the reeled actuator wire 212 is released, and the wire holding part 213 is contracted by the restoring force (elastic force). Therefore, the reeled actuator wire 212 is drawn out and moved counter-clockwise in FIG. 4A.

The power generating device 211 is located on the other end (beginning end) side of the actuator wire 212.

The tactile sense presenting pin 214 is used for giving a contact sense (contact or no contact, or strength of contact) to the finger pad of the user, which is configured of a minute contact plate (contact part) 214a contacting with the finger pad and a supporting part 214b for supporting the contact plate 214a. One end of the supporting part 214b is fixed at some points along the actuator wire 212, and the contact plate 214a is disposed on the other end.

In the embodiment, as shown in FIG. 4A, the part of the glove to be worn on the fingertip (to cover the fingertip) has a double structure (e.g. the structure in which two members such as cloth are overlaid with each other and some kind of member is housed between the two members) in the glove 2a of the real space glove 20. Inside the portion covering the fingertip (inside the double structure), a part of the actuator wire 212, the wire holding part 213, the supporting part 214b, and the tactile sense presenting pin supporting part 215 for controlling the movement of the tactile sense presenting pin 214 in the moving direction of the actuator wire 212 are disposed. Then, inside the glove 2a where the finger is housed, one end side of the supporting part 214b is projected and on this the contact plate 214a is placed.

In the embodiment, the contact plate 214a is in the state that it always contacts with the fingertip of the hand wearing the real space glove 20. However the invention is not limited to this, and it is acceptable that the contact plate 214a is configured to have the state that the contact plate 214a is separated from the fingertip (the state where it does not contact with the fingertip).

In FIG. 4A, a single unit tactile sense generating sub-device 210 (a single tactile sense presenting pin 214) is typically depicted for simplifying the description. However, as described above, the tactile sense generating device 21 actually has a plurality of the unit tactile sense generating sub-devices 210. A plurality of the tactile sense presenting pins 214 is disposed at the position corresponding to the finger pad of the user's fingertip when the user wears the real space glove 20, for example, along the finger pad and arranged crosswise and lengthwise (in a matrix) over the finger pad.

The tactile sense presenting pin supporting parts 215, limiting the movement of the supporting part 214b of the tactile sense presenting pin 214 in the moving direction of the actuator wire 212, are disposed either side of the tactile sense presenting pins 214, toward the finger tip and toward finger base.

Moreover, it is acceptable that each of the tactile sense presenting pins 214 is disposed regularly or irregularly.

Next, the operation of generating a tactile sense by the tactile sense generating device 21 will be described.

A user wears the real space glove 20 and moves the hand and fingers, and then the fingertip (finger pad) virtually contacts with a thing (virtual object), that is, the object appearing in a virtual space. Thus, the information processing device 8 calculates the pressing force when the contact has been actually made, and converts it to PWM data for the power generating device 211 (for example, data showing a excitation pattern to rotate the motor 211a) based on the calculated result.

In this case, the virtual space (three-dimensional space) is configured with the. X-, Y- and Z-axes, that is, XYZ coordinates (three-dimensional coordinates). The matching of the coordinates of the object with the coordinates of the user's fingertip is checked, and if there is a match it is determined that the part of the object corresponding to the matching coordinates contacts with the part of the user's fingertip corresponding to the matching coordinates. The coordinates of the user's fingertip are derived based on the signals (information) sent to the information processing device 8 from the position and attitude sensing device 23 (described later) via the signal sending and receiving device 26.

Subsequently, the information processing device 8 sends the derived PWM data and the data, specifying the power generating device 211 which is to operate contact plates 214a for applying the pressing force to the contact position when the contact has been actually made, to the real space glove 20. The real space glove 20 drives the specified power generating device 211 in accordance with the received PWM data, and reels the actuator wire 212.

Figure 4B:
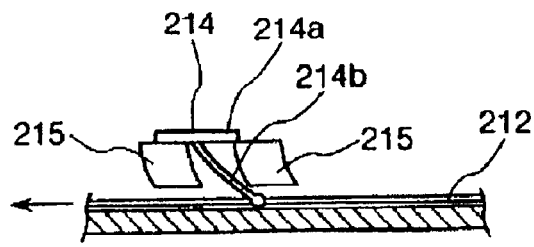

When the actuator wire 212 is reeled, the actuator wire 212 disposed on the finger pad is moved to the direction of the tip of the finger along the finger pad. As shown in FIG. 4B, the tactile sense presenting pin 214 fixed to the actuator wire 212 is also moved to the direction of the tip of the finger along the finger pad.

Figure 4C:
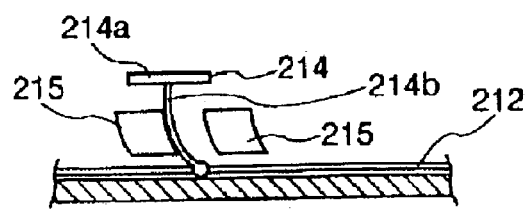

At this time, as shown in FIG. 4C, movement of the tactile sense presenting pin 214 to the direction of the tip of the finger is limited by the tactile sense presenting pin supporting part 215, and it is moved upward in FIG. 4C as guided by the tactile sense presenting pin supporting part 215 (it is projected toward the finger pad). More specifically, the contact plate 214a of the tactile sense presenting pin 214 is moved upward nearly vertically toward the surface of the finger pad. The supporting part 214b of the tactile sense presenting pin 214 slants away from the vertical direction in the direction of the tip of the finger at standby time (in the initial state), as shown in FIG. 4B. The force moving the contact plate 214a upward nearly vertically is exerted, and the contact plate 214a presses the finger pad nearly in the vertical direction. Thus, the pressing force is applied to the finger pad of the user's hand.

This operation is performed by the specified unit tactile sense generating sub-device 210 selected among the plurality of the unit tactile sense generating sub-devices 210. Therefore, the tactile sense is presented (given) to the finger pad of the user's hand. Accordingly, the user can obtain a sensation at the finger pad corresponding to the degree of contact with the thing (object) by the finger pad in the virtual space.

In the specified unit tactile sense generating sub-device 210, the motor 211a is stopped by the power generating device 211, and the reeled actuator wire 212 is released. Then, the wire holding part 213 contracts, providing a restoring force (elastic force), and thus the reeled actuator wire 212 is drawn out.

When the actuator wire 212 is drawn out, the actuator wire 212 disposed on the finger pad is moved to the direction of the base of the finger (the right side in FIG. 4C) along the finger pad. The tactile sense presenting pin 214 mounted and fixed to the actuator wire 212 is also moved to the direction of the base of the finger along the finger pad. The tactile sense presenting pin 214 returns to the initial state shown in FIG. 4B. Accordingly, the pressing force applied to the finger pad of the user's hand by the tactile sense presenting pin 214 is substantially eliminated.

According to the tactile sense generating device 21, the actuator wire 212 is disposed nearly parallel to the finger pad (along the finger pad), and the actuator wire 212 is reeled to apply the force nearly vertically to the finger pad. Therefore, the mechanism of giving the tactile sense can be formed with a low profile, thus the thickness of the finger pad side of the real space glove 20 on the finger pad side can be suppressed as much as possible.

In addition, slack of the actuator wire 212 can be prevented, and a target magnitude of pressing force can be applied to the user's finger pad from the tactile sense presenting pin 214 more accurately and surely.

Figure 5:
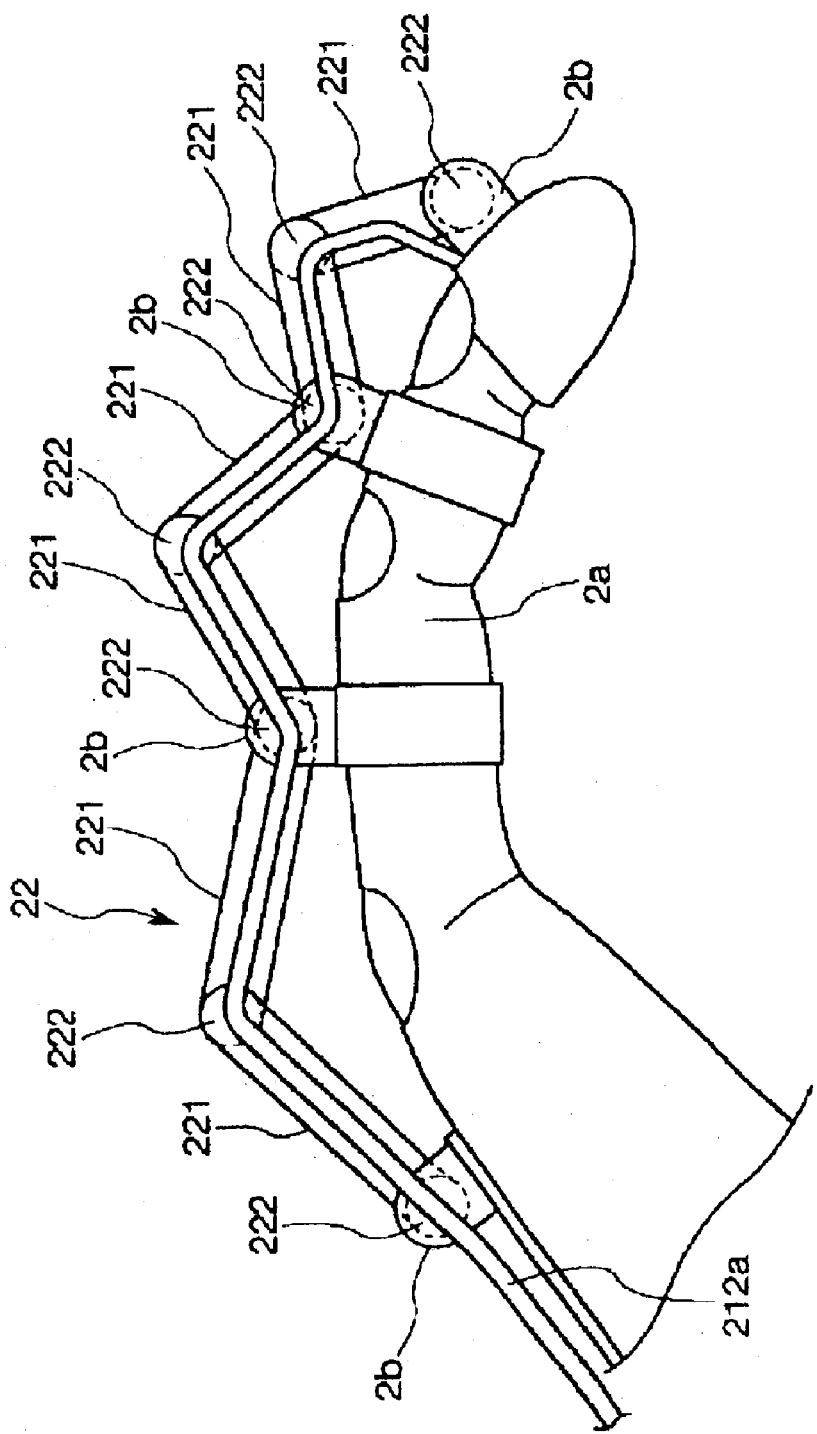
FIG. 5 is an external view illustrating a configuration of the kinesthetic sense generating device of the real space glove shown in FIG. 1.
Figure 6:
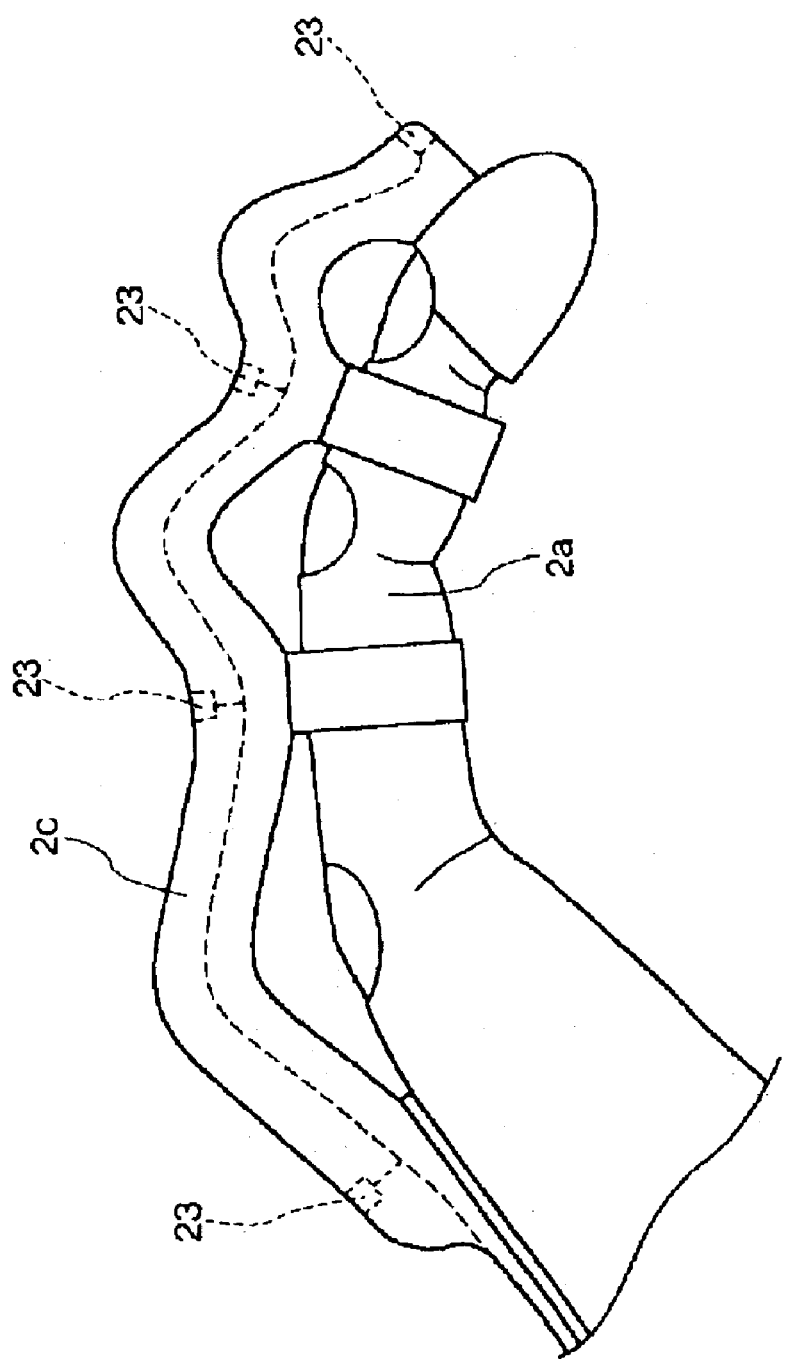
FIG. 6 is an external view illustrating a configuration of the kinesthetic sense generating device of the real space glove shown in FIG. 1.

FIGS. 5 and 6 are external views illustrating the exemplary configuration of the appearance of the kinesthetic sense generating device 22. In FIG. 5 the frame cover is removed.

As shown in FIG. 5, the kinesthetic sense generating device 22 is disposed on the back side of the user's finger when the real space glove 20 is worn. In addition, the configuration and operation of each of the kinesthetic sense generating devices 22 are almost the same, thus one of them will be typically described below.

The kinesthetic sense generating device 22 has a link mechanism having a plurality of frames 221 pivotably rotatably joined (six frames in the embodiment), a plurality of link motors (power sources) 222 for pivoting each of the frames 221 (seven motors in the embodiment), and a plurality of frame holders 2b disposed in the glove 2a (four frame holders in the embodiment).

The frame holders 2b are disposed on 1) the part of the glove closer to the tip end than the distal interphalangeal joint of the user's finger, 2) the glove part between the distal interphalangeal joint and the proximal interphalangeal joint (the joint between the middle phalanx and the proximal phalanx), 3) the glove part between the proximal interphalangeal joint and the metacarpophalangeal joint, and 4) the glove part between the base end side and the metacarpophalangeal joint (the joint between the proximal phalanx and the metacarpal) when the user wears the real space glove 20.

The link mechanism is mounted on the glove 2a by the frame holders 2b at the back side of the user's finger when the real space glove 20 is worn.

More specifically, the frame 221 at the tip end side of the link mechanism (the right side in FIG. 5) is disposed so that the end of the frame 221 is closer to the user's fingertip than the distal interphalangeal joint when the user wears the real space glove 20. The tip of the frame 221 is attached pivotably to the frame holder 2b.

Furthermore, the frame 221 at the base end side of the link mechanism (the left in FIG. 5) is located closer to the wrist than the metacarpophalangeal joint of the user's finger when the user wears the real space glove 20. The end part of the frame 221 is attached pivotably to the frame holder 2b.

Moreover, the other frames 221 of the link mechanism are disposed so that the second and third frame joining parts from each end are located at the positions between the distal interphalangeal joint and the proximal interphalangeal joint and between the proximal interphalangeal joint and the metacarpophalangeal joint when the user wears the real space glove 20, these frame joining parts attached pivotably to the frame holders 2b.

The drive power (torque) of the separate link motors 222 is transmitted to the corresponding frames 221 through a power transmission part (not shown in the drawing). More specifically, when the link motors 222 are rotated and driven in a predetermined direction, the corresponding frames 221 are pivoted in a specific direction. Thus, the angle of the frames 221 is changed (adjusted).

The bundle 212a of the actuator wires 212 is shown in FIG. 5.

Each of the frames 221 and link motors 222 of the kinesthetic sense generating device 22 are housed in a frame cover 2c made of cloth, for example, as shown in FIG. 6.

In addition, as shown in FIG. 6, inside the frame cover 2c, a plurality of the position and attitude sensing devices (position detecting units) 23 for detecting the positions and attitudes of predetermined portions of a hand and finger is disposed (four parts in the embodiment). Each of the position and attitude sensing devices 23 is disposed so as to keep a constant positional relationship to the portion (detection position) whose position and attitude is to be detected.

More specifically, each of the position and attitude sensing devices 23 are mounted and fixed to the each of the link motors 222 fixed to the positions where the frame holders 2b are disposed. Therefore, the positional relationship between a portion where the position and attitude sensing devices 23 are disposed and a predetermined portion on the user's palm side is kept constant. Accordingly, when the position and attitude sensing device 23 detects its position and attitude, the position and attitude of the predetermined portion on the user's palm side can be derived easily and accurately.

Furthermore, each of the position and attitude sensing devices 23 are disposed on the back side of the hand, and thus the thickness of the finger pad side of the real space glove 20 can be suppressed as much as possible.

Moreover, as shown in FIG. 3, the position and attitude sensing device 23 is also disposed at the position on the base end side of the arm of the real space glove 20 when the user wears the real space glove 20.

These position and attitude sensing devices 23 allow sure tracking of the position and attitude of each portion of the fingers, hand, wrist and arm wearing the real space glove 20.

Next, the operation of generating a kinesthetic sense by the kinesthetic sense generating device 22 will be described.

The user wears the real space glove 20 and moves the hand and fingers, and when the hand and fingers virtually contact with a thing (virtual object) appearing in a virtual space, the information processing device 8 calculates the reaction force from the object to the finger (each joint of the finger) when the contact has been actually made by using an calculation device 81 (described later), and it converts the reaction force to PWM data for each of the link motors 222 (for example, data showing the excitation pattern for rotating the link motors 222) based on the calculated result.

The process of determining whether the contact has been made with the object by the user's hand and finger is the same as the case of the tactile sense generating device 21.

The information processing device 8 sends the derived PWM data and data, specifying the link motors 222 to be driven, to the real space glove 20. The real space glove 20 rotates and drives the specified link motors 222 in a predetermined direction according to the received data, pivots the corresponding frames 221 in the predetermined direction, and adjusts the angle of each of the frames 221. That is, it adjusts the angle of the frames 221 at both end parts of the link mechanism and the angle of each of the frame joining parts.

Adjusting the angle of the frames 221 allows the specified magnitude of force to be applied to specified frame holders 2b, and thus a force corresponding to the reaction force from the object appearing in the virtual space is applied to each of the joints of the user's finger. More specifically, the kinesthetic sense is applied to each of the joints of the finger.

The kinesthetic sense generating device 22 has a function of adjusting the distance between the plurality of the glove parts to be worn on a plurality of portions of the finger (also serves as an adjusting device).

For example, as shown in FIG. 5, the predetermined frames 221 are pivoted and the angle of the frames 221 is adjusted. Accordingly, the distance between each of the frame holders 2b can be extended or shortened.

Figure 7:
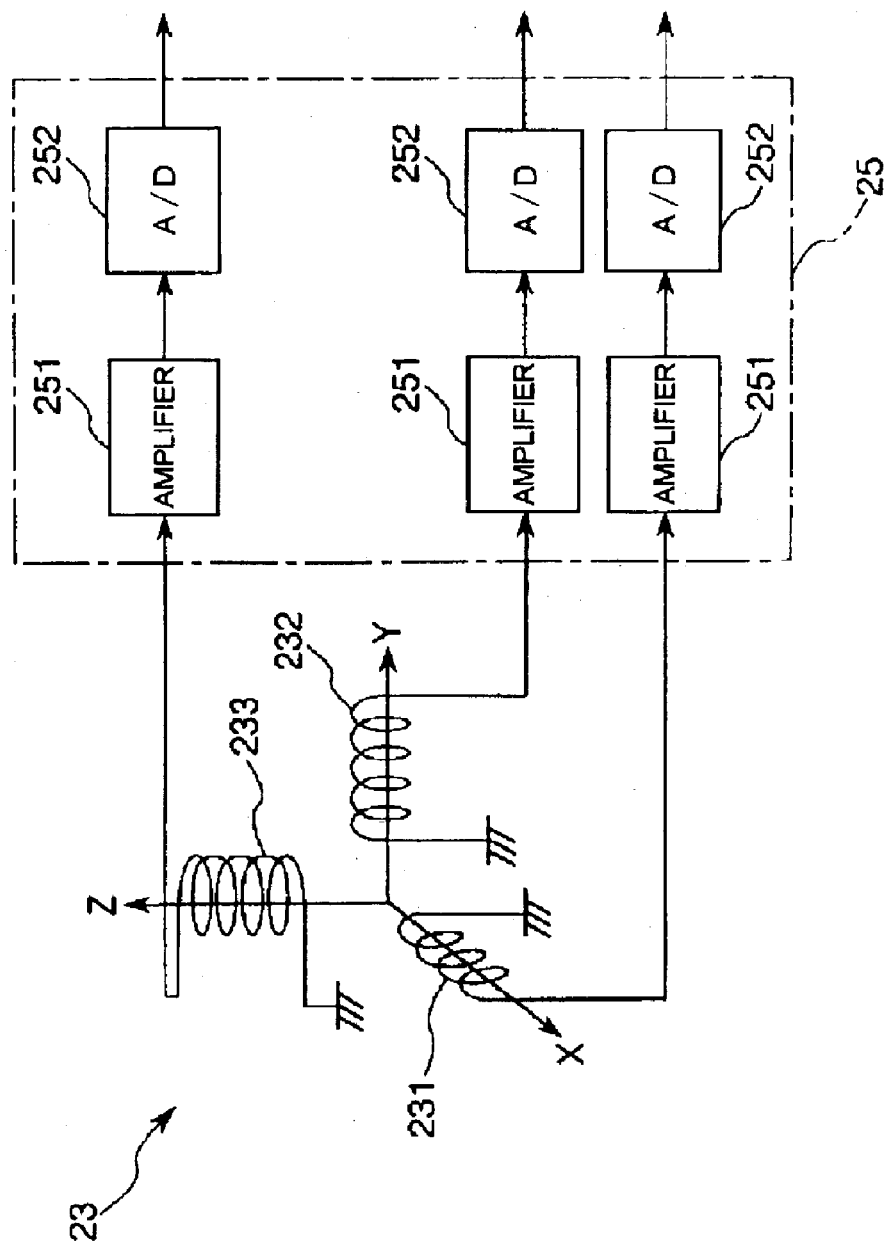
FIG. 7 is a block diagram illustrating a configuration of the position and attitude sensing device of the real space glove shown in FIG. 1.

FIG. 7 is a block diagram illustrating an exemplary configuration of the position and attitude sensing device 23 of the real space glove 20. In the embodiment, a position sensor with an orthogonal coil system (orthogonal coil type) is used for the position and attitude sensing device 23. More specifically, as shown in FIG. 7, the position and attitude sensing device 23 is configured of an X-direction detecting coil 231, a Y-direction detecting coil 232, and a Z-direction detecting coil 233. The X-, Y- and Z-directions are orthogonal to each other.

The information processing device 8 is disposed with a magnetic field generating device 88 for generating a magnetic field, which will be described later. For example, a product having almost the same configuration as the position and attitude sensing device 23, that is, a magnetic field generator of the orthogonal coil system (orthogonal coil type, e.g., the X-direction coil, the Y-direction coil, and the Z-direction coil) is used for the magnetic field generating device 88.

The magnetic field generated by the magnetic field generating device is detected by the position and attitude sensing device 23. In this case, the magnetic field is generated by the X-direction coil, Y-direction coil, and Z-direction coil of the magnetic field generating device with time-sharing manner in this order. The magnetic fields generated by each of the coils are detected by three coils, the X-direction detecting coil 231, Y-direction detecting coil 232 and Z-direction detecting coil 233 of the position and attitude sensing device 23.

Each of signals (detected data) detected in the X-, Y- and Z-directions by the position and attitude sensing device 23 is amplified in amplifiers 251 in the signal processing device 25, and converted to digital signals in an A/D conversion part 252. Then, they are outputted to the signal sending and receiving device 26 shown in FIG. 2, and sent to the information processing device 8 by the signal sending and receiving device 26.

The information processing device 8 receives the signals, derives the position and attitude of each part of the fingers, hand, wrist and arm wearing the real space glove 20 based on the signals (information), and utilizes the information for each of the predetermined processes.

For the virtual space display device 5, a product having a form of being worn on the face, that is, a device of an eyeglass shape called an HMD (head mount display) is used in the embodiment.

Figure 8:
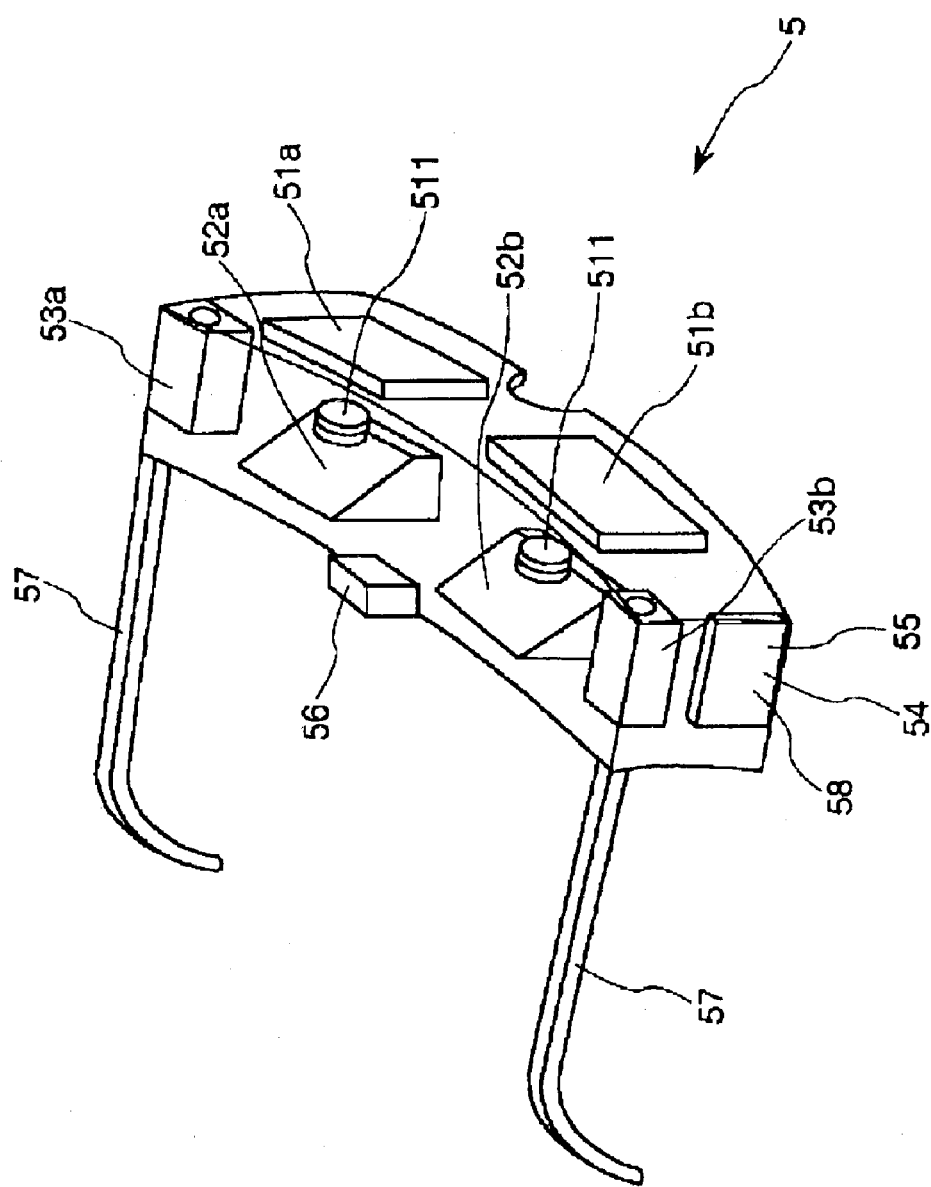
FIG. 8 is a perspective view illustrating the appearance of a configuration of the virtual space display device shown in FIG. 1.
Figure 9:
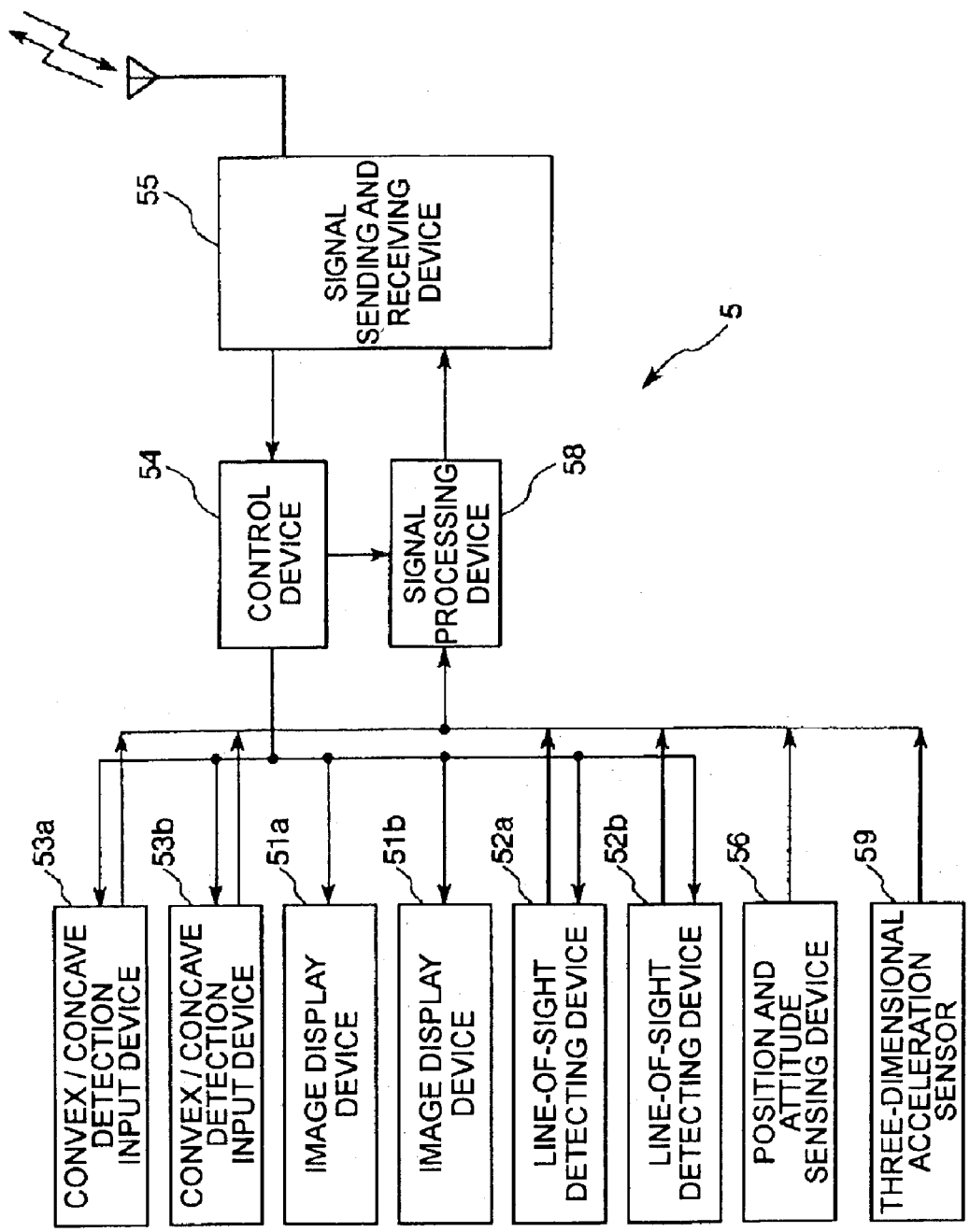
FIG. 9 is a block diagram illustrating a configuration of the circuit of the virtual space display device shown in FIG. 1.

FIG. 8 is a perspective view illustrating an exemplary configuration of the appearance of the virtual space display device 5. FIG. 9 is a block diagram illustrating an exemplary circuit configuration of the virtual space display device 5.

The virtual space display device 5 has image display devices 51a and 51b for displaying a virtual space image to the wearer (user), line-of-sight detecting devices 52a and 52b for detecting the line of sight of the wearer, concave/convex detecting input parts 53a and 53b for taking in an image (picture) of a surrounding object, a control device 54 for controlling the entire device, a signal sending and receiving device 55 for sending and receiving signals to and from the information processing device 8, a position and attitude sensing device (position detecting unit) 56 for sensing the user's point of gaze, fitting parts 57 to be placed on the ears for holding the device to the head, a signal processing device 58 for processing various signals, and a three-dimensional acceleration sensor 59.

Figure 10:
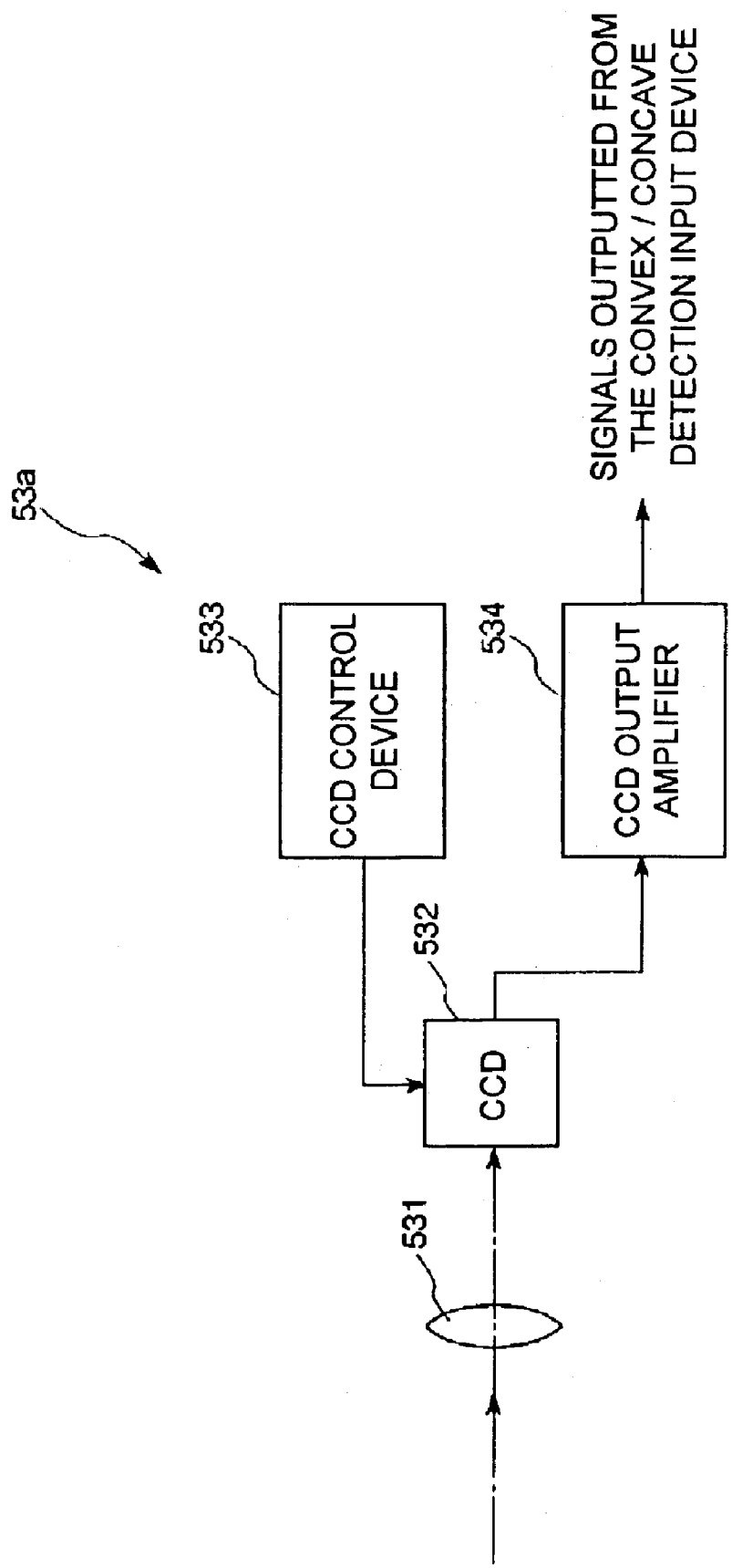
FIG. 10 is a diagram (block and schematic diagram) illustrating a configuration of the convex/concave detection input part of the virtual space display device shown in FIG. 1.

FIG. 10 is a diagram (block and schematic diagram) illustrating an exemplary configuration of the convex/concave detection input part 53a of the virtual space display device 5. In FIG. 10, the convex/concave detection input part 53a has a lens 531, a CCD (imaging device) 532, a CCD control device 533, and a CCD output amplifier 534.

The light (luminous flux) entering the lens 531 is led and focused on the light receiving plane (imaging plane) of the CCD 532 by the lens 531, and its subject image (image of a surrounding object) is taken by the CCD 532. The drive of the CCD 532 is controlled by the CCD control device 533.

The signals outputted from the CCD 532 are amplified in the CCD output amplifier 534, outputted from the convex/concave detection input part 53a, and then inputted to the signal processing device 58 shown in FIG. 9. Then, the signals undergo predetermined signal processing in the signal processing device 58, and they are sent to the information processing device 8 by the signal sending and receiving device 55.

The configuration and operation of the convex/concave detection input part 53b are the same as the convex/concave detection input part 53a, and thus the description is omitted.

Figure 11:
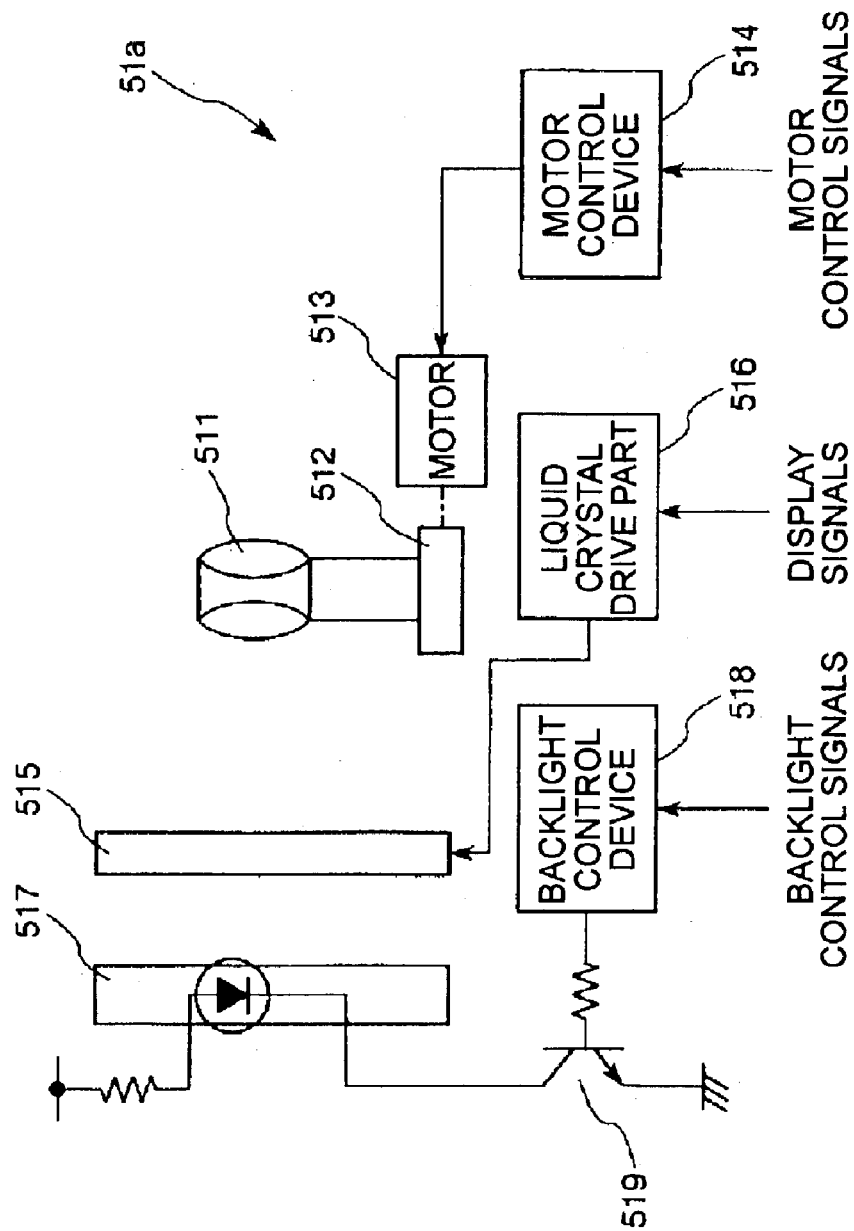
FIG. 11 is a diagram (block and schematic diagram) illustrating a configuration of the image display device of the virtual space display device shown in FIG. 1.

FIG. 11 is a diagram (block and schematic diagram) illustrating an exemplary configuration of the image display device 51a of the virtual space display device 5. In FIG. 11, the image display device 51a has a lens 511, a lens moving mechanism 512 for moving the lens 511, a stepping motor 513, a motor control device 514, a liquid crystal display panel 515 provided with a color filter (not shown in the drawing), a liquid crystal drive device 516, a backlight 517, a backlight control device 518, and a transistor 519.

When a virtual space image is displayed in the image display device 51a, the backlight control device 518 controls the transistor 519 to turn on, the backlight 517 is driven, and light is irradiated onto the liquid crystal display panel 515 from the backlight 517.

Then, the liquid crystal drive part 516 controls the drive of the liquid crystal display panel 515 based on display signals (image data) inputted from the control device 54. Therefore, the virtual space image is displayed on the liquid crystal display panel 515.

The wearer (user) can visually recognize the virtual space image displayed on the liquid crystal display panel 515 through the lens 511 and a half mirror 521 of the line-of-sight detecting device 52a, which will be described later.

The drive of the stepping motor 513 is controlled by the motor control device 514. When the stepping motor 513 is rotated in a predetermined direction, the lens moving mechanism 512 moves the lens 511 toward the liquid crystal display panel 515, that is, away from the wearer's eye.

When the stepping motor 513 is rotated in the reverse direction, the lens moving mechanism 512 moves the lens 511 away from the liquid crystal display panel 515, that is, toward the wearer's eye.

Changing the position of the lens 511 can vary the perceived distance to the virtual space image.

Adjusting the position of the lens 511, that is, adjusting the perceived distance to the virtual space image is performed based on information of the wearer's line of sight detected by the line-of-sight detecting devices 52a and 52b, which will be described later.

The configuration and operation of the image display device 51b are the same as the image display device 51a, and thus description will be omitted.

The line-of-sight detecting devices 52a and 52b have a function of detecting in which direction the wearer's line of sight is (on which part of the virtual space image the focal point is directed), and a function of reading the iris pattern of the wearer for utilization as security information.

Figure 12:
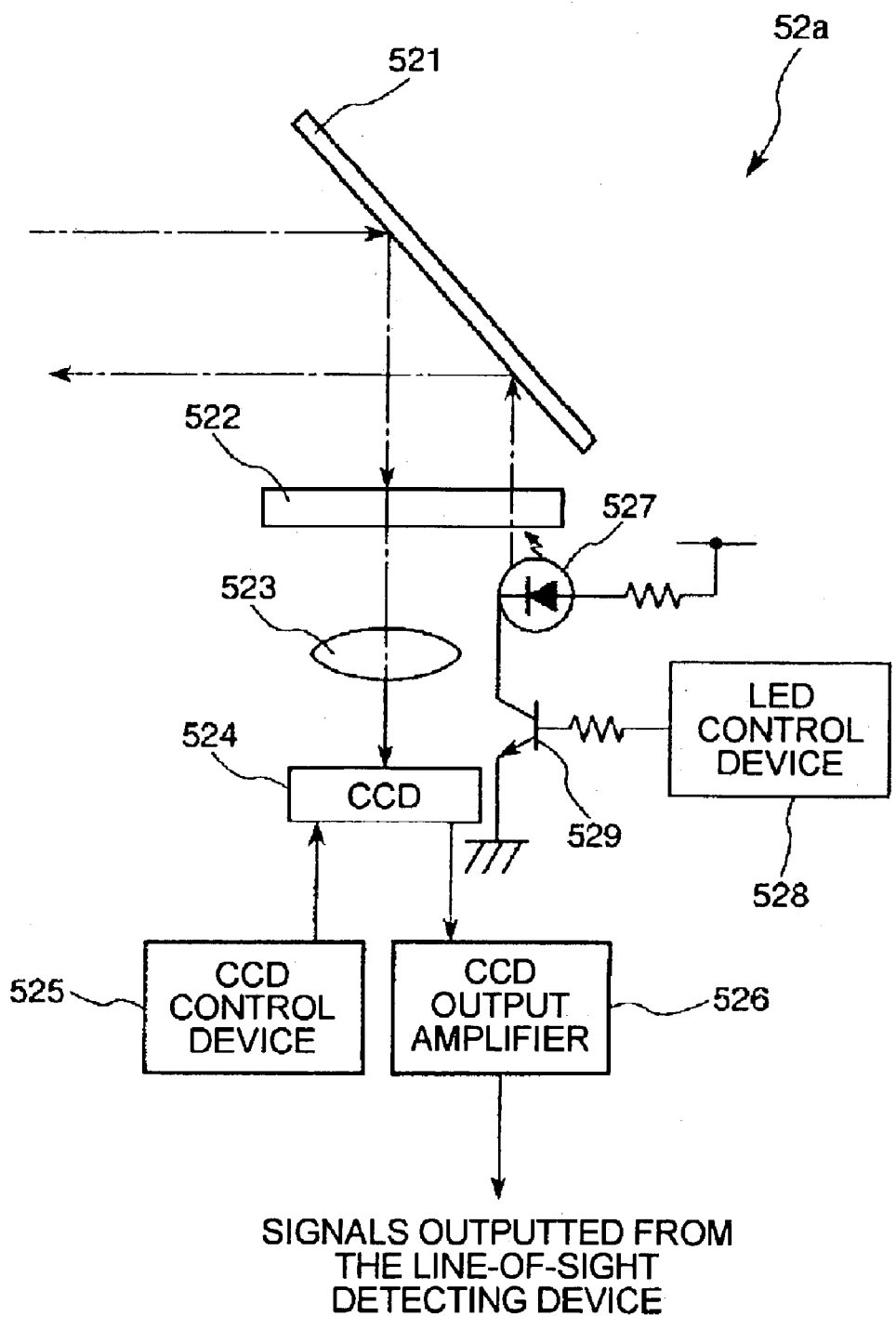
FIG. 12 is a diagram (block and schematic diagram) illustrating a configuration of the line-of-sight detecting device of the virtual space display device shown in FIG. 1.

FIG. 12 is a diagram (block and schematic diagram) illustrating the exemplary configuration of the line-of-sight detecting device 52a of the virtual space display device 5. In FIG. 12, the line-of-sight detecting device 52a has a half mirror 521, a filter 522 for removing visible light and transmitting infrared light, a lens 523, a CCD (imaging device) 524, a CCD control device 525, a CCD output amplifier 526, an LED (light emitting diode) 527 for emitting infrared light, an LED control device 528, and a transistor 529.

The drive of the LED 527 is controlled by the LED control device 528. When the LED control device 528 turns on the transistor 529, the LED 527 is driven and emits infrared light.

The infrared light emitted from the LED 527 passes through the filter 522 and a part of the light is reflected at the half mirror 521 and irradiated onto the wearer's eye.

Then, a part of the reflected light (luminous flux) from the wearer's eye is reflected at the half mirror 521, passes through the filter 522, and is led and focused on the light receiving plane (imaging plane) of the CCD 524 by the lens 523. In this way, the subject image (image on the wearer's eye) is taken by the CCD 524. The drive of the CCD 524 is controlled by the CCD control device 525.

The signals outputted from the CCD 524 are amplified in the CCD amplifier 526, outputted from the line-of-sight detecting device 52*a*, and then inputted to the signal processing device 58 shown in FIG. 9. The signals undergo predetermined signal processing, and they are sent to the information processing device 8 by the signal sending and receiving device 55.

The information processing device 8 receives the signals from the virtual space display device 5 and calculates the direction of the wearer's line of sight (on which part of the virtual space image the focal point is directed) based on the signals (information). It also reads and analyzes the iris pattern of the wearer's eye and utilizes the pattern as security information.

The visible light entering the filter 522 from the lens 523 is removed by the filter 522, and thus the visible light can be prevented from reaching the wearer's eye. Accordingly, decrease in the visibility of the virtual space image displayed on the liquid crystal display panel 515 can be prevented.

The configuration and operation of the line-of-sight detecting device 52*b* are the same as the line-of-sight detecting device 52*a*, and thus the description is omitted.

The virtual space display device 5 uses two image pickup devices (image pickup units), that is, the convex/concave detection input part 53*a* and 53*b*, to take the image of a surrounding object, and sends the taken image data (picture data) to the information processing device 8.

The information processing device 8 derives viewing angle differences from the images taken by the convex/concave detection input parts 53*a* and 53*b*, that is, the taken image data. It creates a virtual space image, that is, image data of the virtual space with recesses and protrusions of surrounding objects calculated from the viewing angle differences. Then, the information processing device 8 sends an image data (picture data), that is, a combined image data (combined picture), which combines the created virtual space image (picture) and the image for placing predetermined virtual objects such as a virtual wallpaper, a virtual personal computer or a virtual book in the virtual space in accordance with the recesses and projections around that object, to the virtual space display device 5.

The virtual space display device 5 displays the image with the use of the image display devices 51*a* and 51*b* based on the image data from the information processing device 8.

In addition, the virtual space display device 5 also displays the image corresponding to the hand and arm on the image display devices 51*a* and 51*b* when the worn real space glove 20, that is, the user's hand and arm are in the area of the image displayed by the image display devices 51*a* and 51*b*.

In this case, the data detected by the plurality of the position and attitude sensing devices 23 disposed on the real space glove 20 is sent to the information processing device 8, and thus the position and attitude of the real space glove 20, that is, the fingers, hand, wrist and arm of the user are recognized by the information processing device 8, as described above. More specifically, the information processing device 8 identifies the position and attitude of the fingers, hand, wrist and arm of the user based on the detailed detected data from the real space glove 20. In the case that they are in the area of the image displayed on the image display devices 51*a* and 51*b*, the virtual space image depicting them is created, the image is combined with the base image to obtain the combined image (image data of the combined image), and the image data is sent to the virtual space display device 5.

Therefore, when the user's hand and arm are in the image area displayed on the image display devices 51*a* and 51*b*, the image corresponding to the hand and arm is displayed on the image display devices 51*a* and 51*b*.

Then, the virtual hand and arm linked to the actual motions of the hand and arm wearing the real space glove 20 move in the virtual space image displayed on the image display devices 51*a* and 51*b*.

The position and attitude sensing device 56 is a sensor for detecting the position and attitude of the virtual space display device 5, that is, the position and attitude of the wearer's face (head). For the position and attitude sensing device 56, the position sensor of the orthogonal coil system, that is, the same sensor as the position and attitude sensing device 23 is used in the embodiment.

Signals (detected data) from the position and attitude sensing device 56 are inputted to the signal processing device 58, undergo predetermined signal processing, and are sent to the information processing device 8 sequentially by the signal sending and receiving device 55. The information processing device 8 updates the virtual space image sequentially at a predetermined time interval based on the detected data.

Accordingly, when the user wearing the virtual space display device 5 moves the head, for example, the virtual space image displayed on the image display devices 51*a* and 51*b* is changed so as to be the image matching with the direction to which the user is facing.

The three-dimensional acceleration sensor 59 is the product for detecting accelerations in three directions of the virtual space display device 5, the directions being orthogonal to each other. For this sensor any products are acceptable if they can be incorporated in the HMD and have some degree of accuracy, such as a piezoelectric type, a servo type, and a strain gauge type. However, in the invention, a highly accurate acceleration sensor is suitable, such as an acceleration sensor using a CMOS.

Signals (acceleration data) detected by the three-dimensional acceleration sensor 59 are outputted to the signal processing device 58. And they undergo predetermined signal processing such as amplification, then they are sent to the information processing device 8 via the signal sending and receiving device 55.

Figure 13:
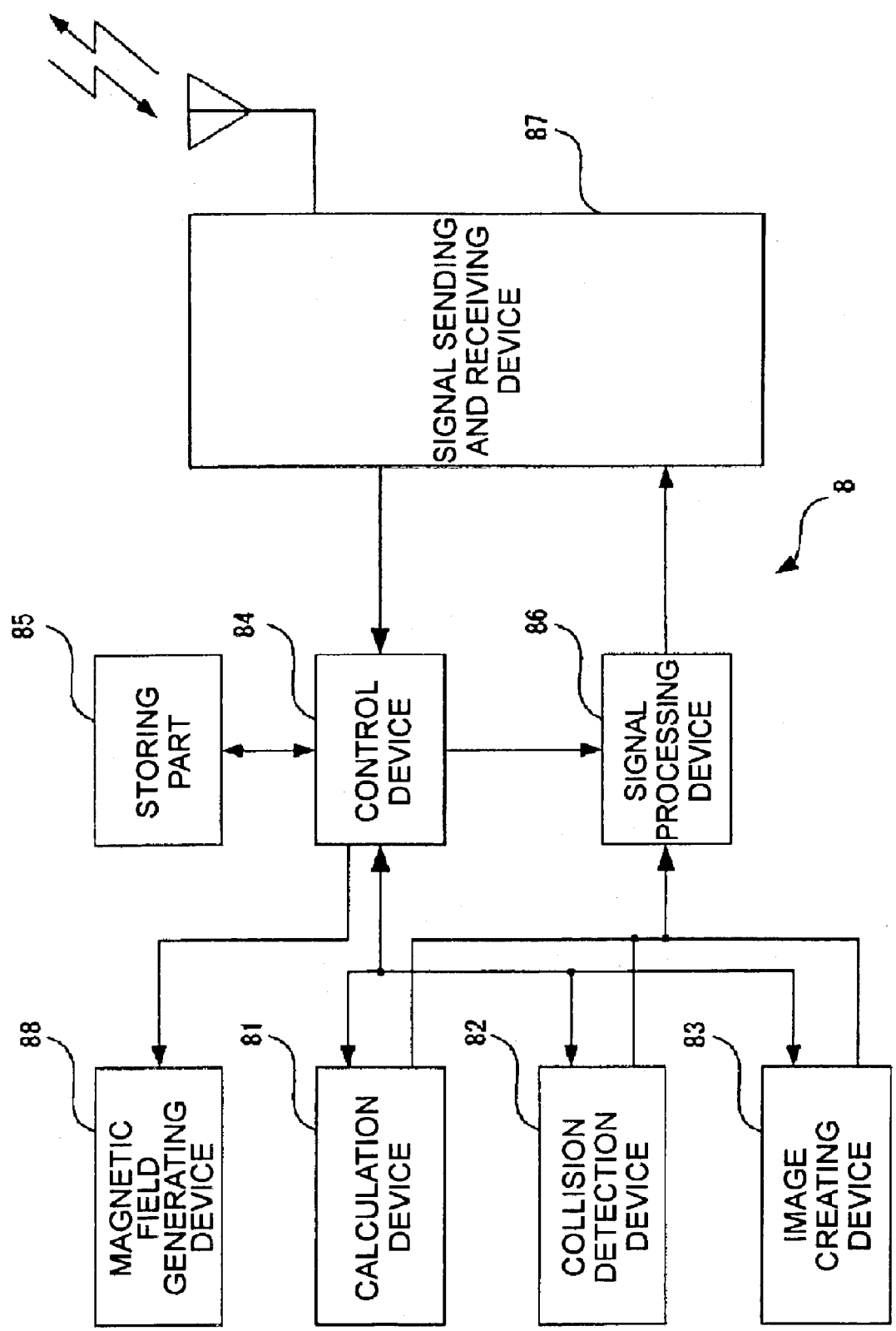
FIG. 13 is a block diagram illustrating a configuration of the circuit of the information processing device shown in FIG. 1.

FIG. 13 is a block diagram illustrating an exemplary circuit configuration of the information processing device 8 shown in FIG. 1. In FIG. 13, the information processing device 8 is provided with an calculation device (calculating unit) 81, a collision detecting part (collision detecting unit) 82, an image creating device (image creating unit) 83, a control device (control unit) 84, a storing part (storing unit) 85, a signal processing device 86, a signal sending and receiving device (communication unit) 87, and the magnetic field generating device 88.

When the finger and hand of the real space glove 20 have made contact with the object in the virtual space, the calculation device 81 determines what kind of the object it is and calculates the reaction force to the finger (each joints of the finger). It converts the calculated reaction force to PWM data for each of the link motors 222 of the real space glove 20, and sends the converted data to the real space glove 20 via the signal processing device 86 and the signal sending and receiving device 87.

In addition, for the display image changing process and the display image combination process, both processes to be described later, the calculation device 81 calculates movement distance from position data inputted from the virtual space display device 5 and calculates a movement speed with the time required for movement, inputted from a timer (not shown) in the control device 84. Alternatively, a movement speed is calculated from the acceleration detected by the three-dimensional acceleration sensor 59 of the virtual space display device 5. And the calculation result is outputted to the control device 84.

The collision detection part 82 is for determining whether each of the fingers of the real space glove 29 have hit the virtual object in the virtual space. The detection result determined by the collision detection part 82 is outputted to the control device 84.

With the order from the control device 84, the image creating device 83 overlays the picture of the user's arm and fingers upon a virtual space image received beforehand from the base station 9, or upon a virtual space image, which is converted from an image taken by the convex/concave detection input parts 53*a* and 53*b* of the virtual space display device 5, to create a combined virtual space image and outputs it to the signal processing device 86. The image creating device 83 updates and creates the virtual space image at predetermined time intervals in accordance with the movement of the real space glove 20 displayed in the virtual space or the movement of the virtual space display device 5, and outputs it to the signal processing device 86.

The control device 84 allows the calculation device 81 to operate the reaction force based on the determination result of the collision detection device 82. In addition, the control device 84 controls the calculations of the calculation device 81, the collision detection device 82 and the image creating device 83. It stores the calculation result, the collision detection result and the created image data in a predetermined storage area of the storing part 85, and sends them to the corresponding devices via the signal processing device 86 and the signal sending and receiving device 87.

Furthermore, in the invention, the control device 84 detects whether the movement speed of the HMD 5 calculated by the calculation device 81 is greater than a predetermined value, and orders the HMD 5 or the image creating device 83 to change or combine its display image based on the detection result.

The storing part 85 has a storage medium (also called a recording medium), in which programs and data are stored in advance that can be read by the computer (not shown in the drawing). The storage medium comprises a magnetic or optical recording medium such as a RAM (Random Access Memory, including both volatile and nonvolatile memories), a FD (Floppy Disk), a HD (Hard Disk), a CD-ROM (Compact Disc Read-Only Memory), or a semiconductor memory, for example. The storage medium is the medium fixedly disposed or detachably mounted on the storing part 85. In the storage medium, programs corresponding to the virtual space display device 5, the information processing device 8 and the tactile and kinesthetic sensation generating device 2 such as various application programs, a display image changing process program, a display image combination process program, data processed by each programs, and document data, are stored.

Furthermore, it is acceptable that a part or all of the programs and data to be stored in the storage medium of a server or client or the like (in the embodiment, the base station 9), configured to be received from the signal sending and receiving device 87 via transmission media such as network lines (for example, the Internet and telephone lines). Moreover, it is acceptable that the storage medium is a storage medium of the server of the base station 9 constructed in a network. It is also acceptable that the programs are configured to be transmitted from a server or client via transmission media such as network lines and installed in the information processing device 8. Additionally, it is acceptable that the above-mentioned programs are for implementing a part of the above-mentioned functions and that the programs can implement the above-mentioned functions by combining with programs already recorded in a computer system.

The signal processing device 86 performs signal processing such as amplifying image data and control signals to be sent to the virtual space display device 5 or the tactile and kinesthetic sensation generating device 2. The signal sending and receiving device 87 controls various signals and data processed in the signal processing device 86 for communicating with external devices such as the virtual space display device 5 and the tactile and kinesthetic sensation generating device 2.

The magnetic field generating device 88 (the detail is not shown in the drawing) is a magnetic field generator (the X-direction coil, Y-direction coil, and Z-direction coil) with the orthogonal coil system (orthogonal coil type) corresponding to the position and attitude sensing device 23 shown in FIG. 7, for example. The magnetic field generating device 88 generates a magnetic field successively in the X-, Y- and Z-direction coils by the order from the control device 84. The magnetic fields generated in the detecting coils 231, 232 and 233 of the position and attitude sensing device 23 of the real space glove 20 are detected, and the position and attitude sensing device 56 of the virtual space display device 5 also detects the magnetic field.

It is acceptable that the magnetic field generating device 88 is housed in the information processing device 8 as shown in the drawing. However, it is also acceptable that magnetic field generating device is configured separately from the information processing device 8. Particularly, when a mobile phone or a PDA is used as the information processing device 8, the magnetic field generating device cannot be disposed inside thereof afterward, thus the separate configuration is useful. In this manner, even though the magnetic field generating device is disposed separately, it is controlled by control signals from the information processing device 8.

Next, the operation (effect) of the image processing apparatus 1 of the first embodiment will be described. Here, the case will be described in which a user utilizes the image processing apparatus 1 and manipulates a virtual personal computer appearing in a virtual space.

The user turns on the power of each part, wears the real space glove 20 on both hands, and wears the eyeglass-shaped virtual space display device 5 (wears it on the face). Then, a virtual space image including the virtual personal computer is displayed on the image display devices 51*a* and 51*b* of the virtual space display device 5.

In addition, when the user's arm is entered in the virtual space images displayed on the image display devices 51*a* and 51*b*, the image of the hand and arm created by the image creating device 83 of the information processing device 8 is displayed as a virtual object in the virtual space image. Subsequently, when the user moves the hand and fingers, the displayed hand and fingers are moved in the virtual space image in the same way.

That is, in the embodiment, the information processing device 8 detects that the objects in the virtual space image, for example, a part of the virtual personal computer (such as a keyboard) and a part of the user's finger are in the same coordinates by the collision detection device 82. Then, it instructs the real space glove 20 to generate a tactile and kinesthetic sensation based on the calculation result by the calculation device 81. More specifically, the information processing device 8 sends the information to specify to be driven power generating devices 211 and PWM data used for driving the power generating devices 211, and the information to specify to be driven link motors 222 and PWM data used for driving the link motors 222 to the real space glove 20 via the signal sending and receiving device 87, wherein the information and the PWM data have been obtained from the calculation of the reaction force by the calculation device 81.

The real space glove 20 drives each of the specified motion generating devices 211 by PWM control at a specified torque for a specified period of time according to the order from the information processing device 8. Accordingly, the contact plate 214*a* of each of the tactile sense presenting pins 214 disposed on the portions in the same coordinates as a part of the virtual personal computer is projected, and the tactile sense is given to the user's fingertips which are in the same coordinates as the part of the virtual personal computer. More specifically, the sensations such as a contact sense, texture, shape and strength are given to each fingertip.

At the same time, the real space glove 20 drives each of the specified link motors 222 by PWM control at a specified torque for a specified period of time according to the order from the information processing device 8. Accordingly, the kinesthetic sense, that is, the force corresponding to a pressing force (reaction force) given to each joint of the fingers, is given to each joint of the fingers when a keyboard, for example, of a real personal computer, is touched by fingers or hands.

Furthermore, when the user moves the finger in the direction of pressing the key of the virtual personal computer, a virtual space image showing the pressing of the key is displayed on the image display devices 51*a* and 51*b* in accordance with the change of the finger coordinates.

In this case, the information processing device 8 creates image data of the virtual space image for recreating the change of the display state based on the pressed key in the virtual space image in the image creating device 83, and performs the process of sending it to the virtual space display device 5. The virtual space display device 5 displays the image depicting that the key on the virtual personal computer is pressed down, based on the image data of the virtual space image received from the information processing device 8.

As described above, according to the tactile and kinesthetic sensation generating device 2 and the image processing apparatus 1, the real space glove 20 can be worn and taken off easily and surely, and the motions (manipulation) in the virtual space can be performed easily and surely.

In addition, the tactile sense and the kinesthetic sense can be presented accurately and surely to each of the fingers according to the virtual space image.

Therefore, the user can move (manipulate) in the virtual space comfortably, easily and surely.

Particularly, a slack of the actuator wire 212 can be prevented in the tactile sense generating device 21. A target magnitude of pressing force can be applied to the user's finger pad from each of the tactile sense presenting pins 214 more accurately and surely.

Accordingly, the user can feel the sensation by each of the finger pads more accurately and surely, wherein the sensation corresponds to the contact with the thing (object) by each finger pad in the virtual space.

Furthermore, in the tactile sense generating device 21, the actuator wire 212 is disposed nearly in parallel to each finger pad (along the finger pad). The actuator wire 212 is reeled, and then a force is applied nearly vertically to each finger pad. Therefore, the mechanism of giving the tactile sense can be as thin as possible, thus the thickness on the finger pad side of the real space glove 20 can be thinner as much as possible.

Moreover, the kinesthetic sense generating device 22 has the link mechanism. Thus, it can respond to either the state of stretching the finger or of bending the finger. Therefore, the kinesthetic sense can be given to each finger more surely.

In the embodiment, the case where the personal computer displayed in the virtual space image is virtually manipulated has been described as an example. However, the invention can be used for handling other articles such as a virtual book. In the case where the virtual book is handled, sensations of touch and reactive force applied to the fingers can be felt when touching the edge of the virtual book or turning the page, when the user touches the edge of a real book or turns the page, for example.

In addition, it is acceptable that the virtual space image is not displayed in the invention. More specifically, the configuration, in which there is predetermined data corresponding to a virtual space image and the tactile sense and the kinesthetic sense are calculated and generated based on the data, is acceptable.

Figure 14:
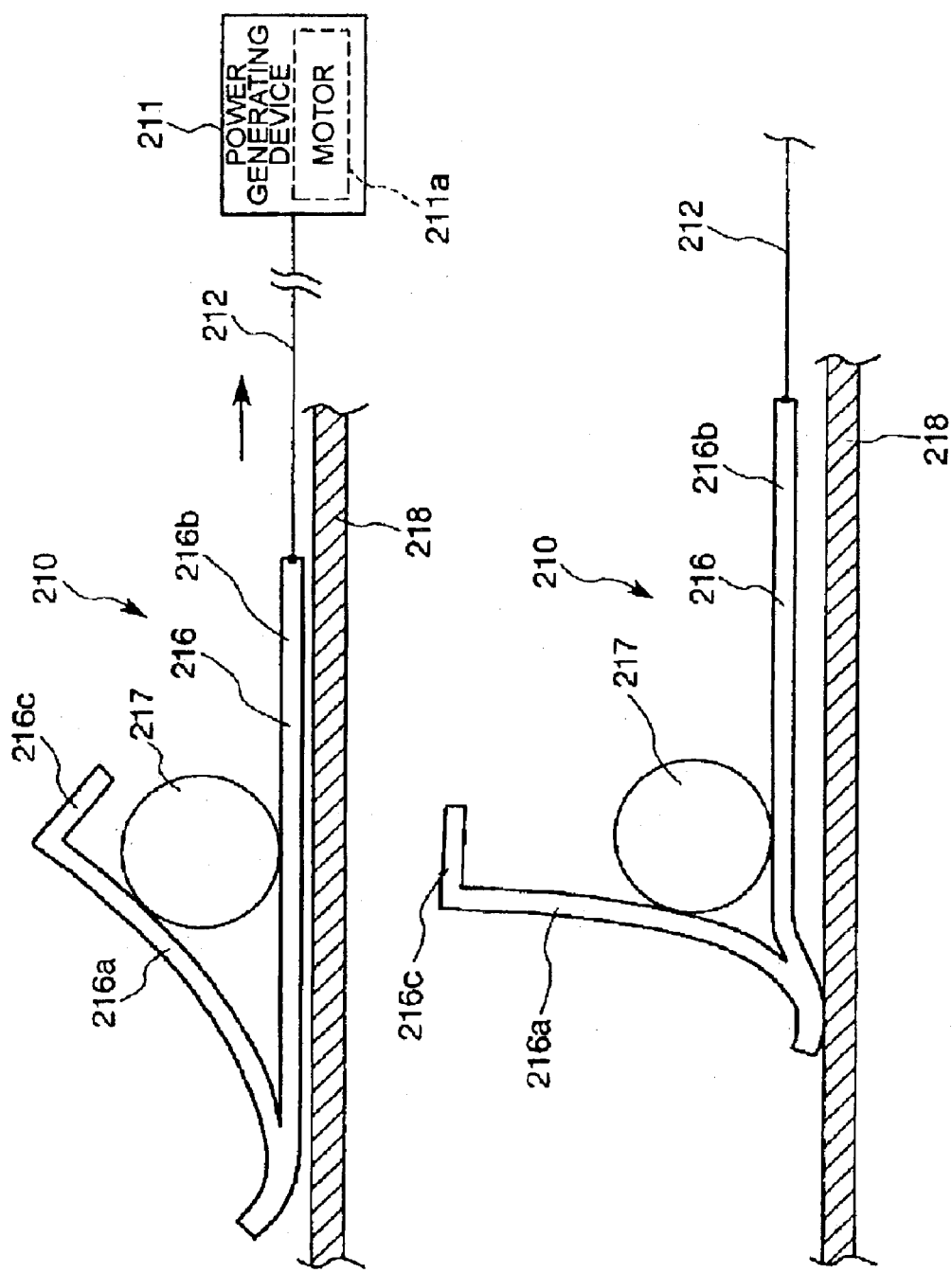
FIGS. 14A and 14B give longitudinal cross sectional views illustrating a configuration of the tactile sense generating sub-device of the tactile and kinesthetic sensation generating device of the second embodiment.

Next, a second embodiment of the tactile and kinesthetic sensation generating device and the image processing apparatus of the invention will be described. FIG. 14 gives longitudinal sectional views illustrating the configuration of the tactile sense generating device of the tactile and kinesthetic sensation generating device of the second embodiment.

Hereafter, a tactile and kinesthetic sensation generating device 2 and an image processing apparatus 1 of the second embodiment will be described mainly with regard to differences from the first embodiment, omitting the description of the same components.

As shown in FIG. 14A, in the tactile and kinesthetic sensation generating device 2 of the second embodiment, each unit tactile sense generating device (actuator) 210 of the tactile sense generating device 21 has a power generating device (transport unit) 211 with a motor (power source) 211*a*, an actuator wire (wire having flexibility) 212 movably disposed in the longitudinal direction, and a tactile sense presenting part 216 for pressing the finger pad to generate tactile sense.

The tactile sense presenting part 216 is used for giving a contact sensation (contact or no contact, or reactive force) to the user's finger pad, which is formed of a member having elasticity (elastic body) such as a leaf spring. In this case, the tactile sense presenting part 216 preferably has a moderate rigidity, and can be an elastic body configured of various metals, for example.

The tactile sense presenting part 216 is configured of a first plate piece (pressing part) 216a and a second plate piece (slide part) 216b. The plate piece 216a is joined to the second plate piece 216b on one edge of them. A minute contact part 216c to contact with the finger pad is disposed on the opposite edge of the first plate piece 216a. For example, the contact part 216c can be formed by bending the end part of the first plate piece 216a toward the second plate piece 216b.

In addition, one edge of the tactile sense presenting part 216, that is, the left edge in FIG. 14A is curved upward in FIG. 14A.

Between the first plate piece 216a and the second plate piece 216b, a cylindrical guide part (moving direction control unit) 217 for controlling the moving direction of the first plate piece 216a is disposed.

Furthermore, a press plate 218 is disposed under the tactile sense presenting part 216 in FIG. 14A. The tactile sense presenting part 216 is movable (slidable) along the press plate 218. In this case, the tactile sense presenting part 216 can be moved smoothly and surely because the left end part is bent in FIG. 14A.

The guide part 217 is fixed to the press plate 218, and the press plate 218 is fixed to a glove 2a. More specifically, both the guide part 217 and the press plate 218 are disposed fixedly to the glove 2a.

Moreover, to the right edge of the second plate piece 216b of the tactile sense presenting part 216 in FIG. 14A, one end of the actuator wire 212 is fixed.

The motor 211a is driven by the power generating device 211 to reel the actuator wire 212, and then the actuator wire 212 is moved to the right side (the direction of the base end of the finger) along the finger pad in FIG. 14A. With this movement, the tactile sense presenting part 216, mounted and fixed to the actuator wire 212, is also moved along the finger pad on the right side in FIG. 14A.

At this time, as shown in FIG. 14B, the first plate piece 216a of the tactile sense presenting part 216 is restrained from moving to the right side in FIG. 14B by the guide part 217, and instead moves upward as in FIG. 14B (to project toward the finger pad) as guided by the guide part 217. More specifically, the tactile sense presenting part 216 is elastically deformed, and the attitude of the first plate piece 216a is changed into the attitude shown in FIG. 14B. Therefore, the contact part 216c is moved (pressed) upward nearly vertically to the surface of the finger pad.

In the meantime, the actuator wire 212 is applied force by the restoring force (elastic force) of the tactile sense presenting part 216 to the left side in FIG. 14B (in the reverse direction of the moving direction of the actuator wire 212 when the first plate piece 216a is projected). More specifically, the tactile sense presenting part 216 (first plate piece 216a) serves as a force applying unit.

Because the force works on the contact part 216c to move it nearly vertically, the contact part 216c presses the finger pad nearly in the vertical direction. Accordingly, a pressing force is given to the user's finger pad.

This operation is done by a specified unit tactile sense generating sub-devices 210 selected among a plurality of such unit tactile sense generating sub-devices 210, and thus a tactile sense is presented (given) to the user's finger pad. Therefore, the user can obtain the sensation in the finger pad corresponding to the contact with the thing (object) by the finger pad in the virtual space image.

In the specified unit tactile sense generating sub-devices 210, when the motor 211a is stopped by the power generating device 211, and the reeled actuator wire 212 is released, the tactile sense presenting part 216 returns to its initial state shown in FIG. 14A by the restoring force (elastic force) of the tactile sense presenting part 216 and the pressure from the user's finger. Accordingly, the pressing force, given to the finger pad of the user's hand from the tactile sense presenting part 216, is substantially eliminated.

According to the tactile and kinesthetic sensation generating device 2 and the image processing apparatus 1, the same advantage as the first embodiment can be obtained.

Next, a third embodiment of the tactile and kinesthetic sensation generating device and the image processing apparatus of the invention will be described.

Figure 15:
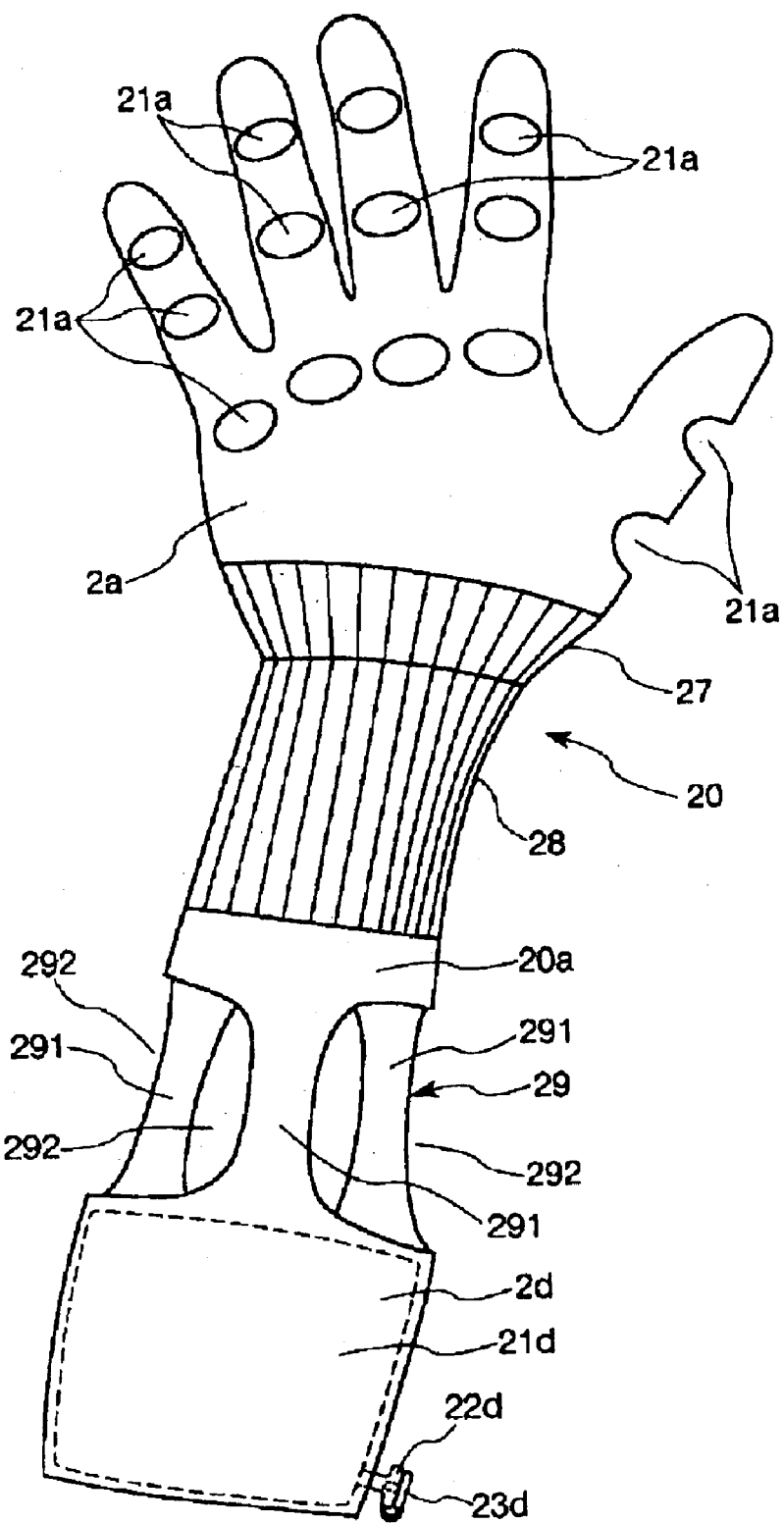
FIG. 15 is an external view illustrating the appearance of a configuration of the real space glove of the tactile and kinesthetic sensation generating device of the third embodiment (some parts omitted)

FIG. 15 is an external view illustrating the configuration of the appearance of the real space glove of the tactile and kinesthetic sensation generating device of the third embodiment (some parts omitted in the drawing). The tactile sense generating device 21, the power generating device 211, the kinesthetic sense generating device 22, the position and attitude sensing device 23, the control device 24 and the electric power supply device 30 shown in FIG. 3 are not depicted in FIG. 15.

Hereafter, a tactile and kinesthetic sensation generating device 2 and an image processing apparatus 1 of the third embodiment will be described, concentrating on the differences from the first embodiment and omitting the description of the same components.

As shown in FIG. 15, in the tactile and kinesthetic sensation generating device 2 of the third embodiment, an arm fixing part 2d, an air injection system fixing the arm by air pressure (pressing force) disposed on the elbow-side end (base end) of the sleeve part 20a of a glove 2a in a real space glove 20, is provided.

The arm fixing part 2d is configured of an inflatable arm fixing part main body 21d and an air injecting part 22d disposed in the arm fixing part main body 21d. The appearance of the arm fixing part main body 21d is a sleeve.

The hollow portion of the air injecting part 22d communicates with the inside of the arm fixing part main body 21d, and a lid 23d is disposed on the end of the air injecting part 22d.

When the lid 23d is mounted on the end part of the air injecting part 22d, the air-tightness inside the arm fixing part main body 21d is maintained, whereas when the lid 23d is removed, air can be injected or exhausted from the arm fixing part main body 21d through the air injecting part 22d.

This arm fixing part 2d is shaped so as to fit to the shape of a user's arm with the use of a mold such as a rubber mold.

When a user puts on the real space glove 20, the user puts on the glove 2a at first. Then, air is injected into the arm fixing part main body 21d of the arm fixing part 2d.

In this air injection, for example, the lid 23d is removed from the end part of the air injecting part 22d, and air is blown into the arm fixing part main body 21d from the air injecting part 22d. Then, when a predetermined amount of air has been injected, the lid 23d is mounted on the end part of the air injecting part 22d.

In this manner, the real space glove 20 is fixed to the user's arm by air pressure of the arm fixing part 2d, and fixed to the user's wrist by the restoring force (elastic force) of the wrist fixing part 28.

When the user removes the real space glove 20, air is removed from the inside of the arm fixing part main body 21d of the arm fixing part 2d at first. Then, the hand is taken out of the real space glove 20.

According to the tactile and kinesthetic sensation generating device 2 and the image processing apparatus 1, the same advantage as the first embodiment can be obtained.

Furthermore, in the above tactile and kinesthetic sensation generating device 2, the arm fixing part 2d is operated by an air injection system, thus the real space glove 20 can be worn or taken off easily and quickly.

Moreover, it is acceptable that the tactile sense generating sub-devices 210 of the tactile sense generating device 21 is configured as in the second embodiment in the invention.

Next, a fourth embodiment of the tactile and kinesthetic sensation generating device and the image processing apparatus of the invention will be described.

Figure 16:
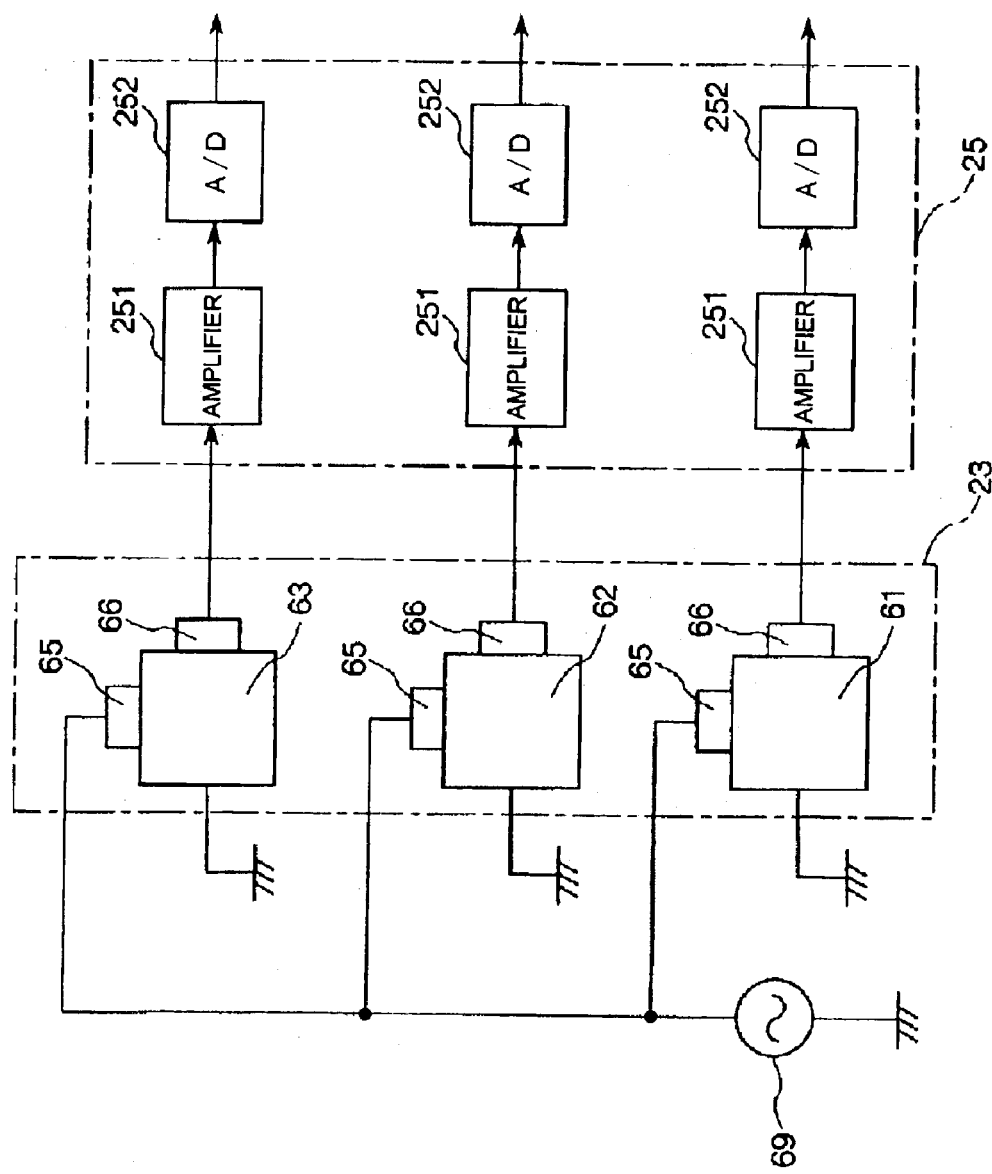
FIG. 16 is a block diagram illustrating a configuration of the position and attitude sensing device of the tactile and kinesthetic sensation generating device of the fourth embodiment.
Figure 17:
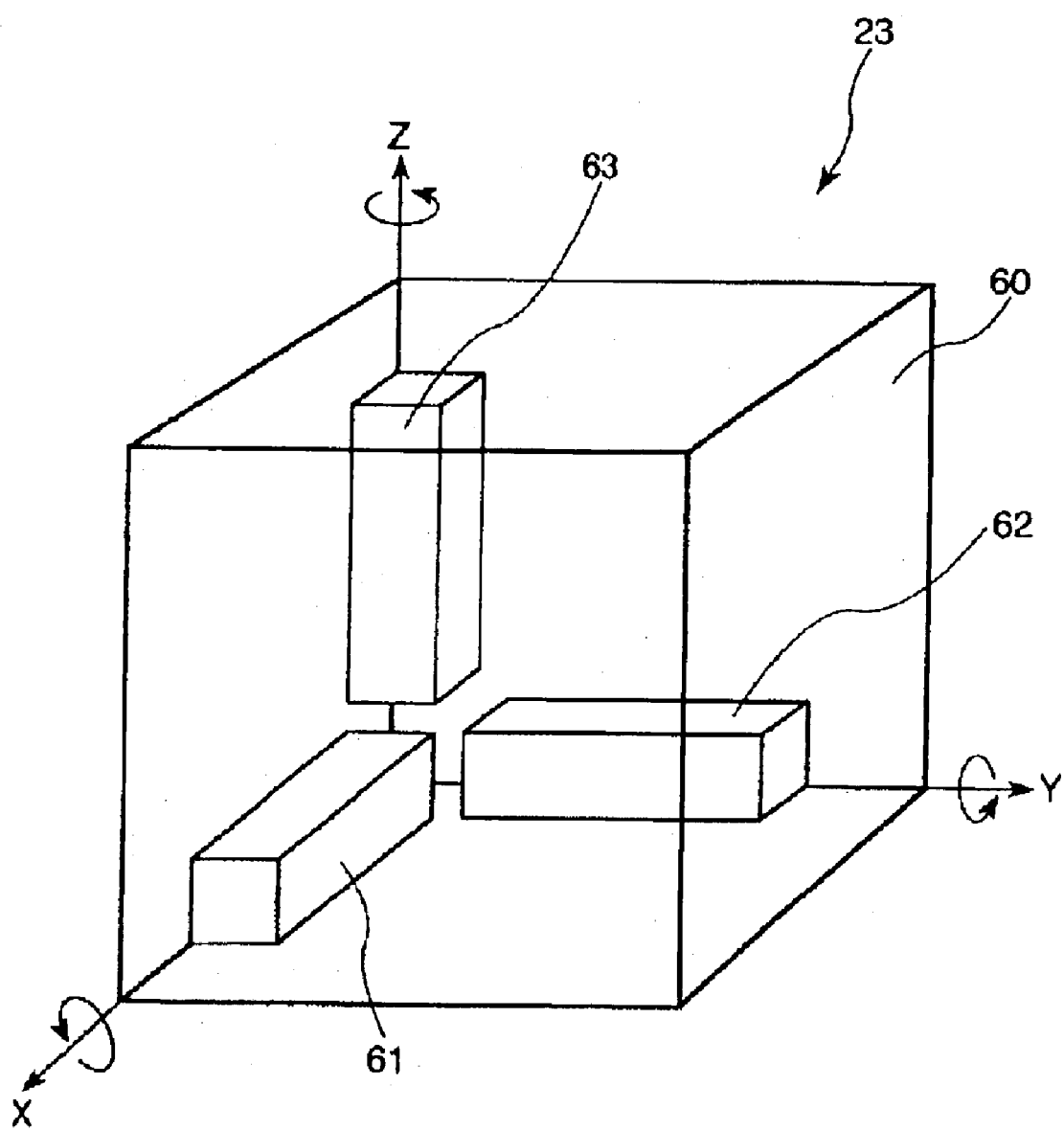
FIG. 17 is an external view illustrating a configuration of the position and attitude sensing device of the tactile and kinesthetic sensation generating device of the fourth embodiment (some parts omitted)
Figure 18:
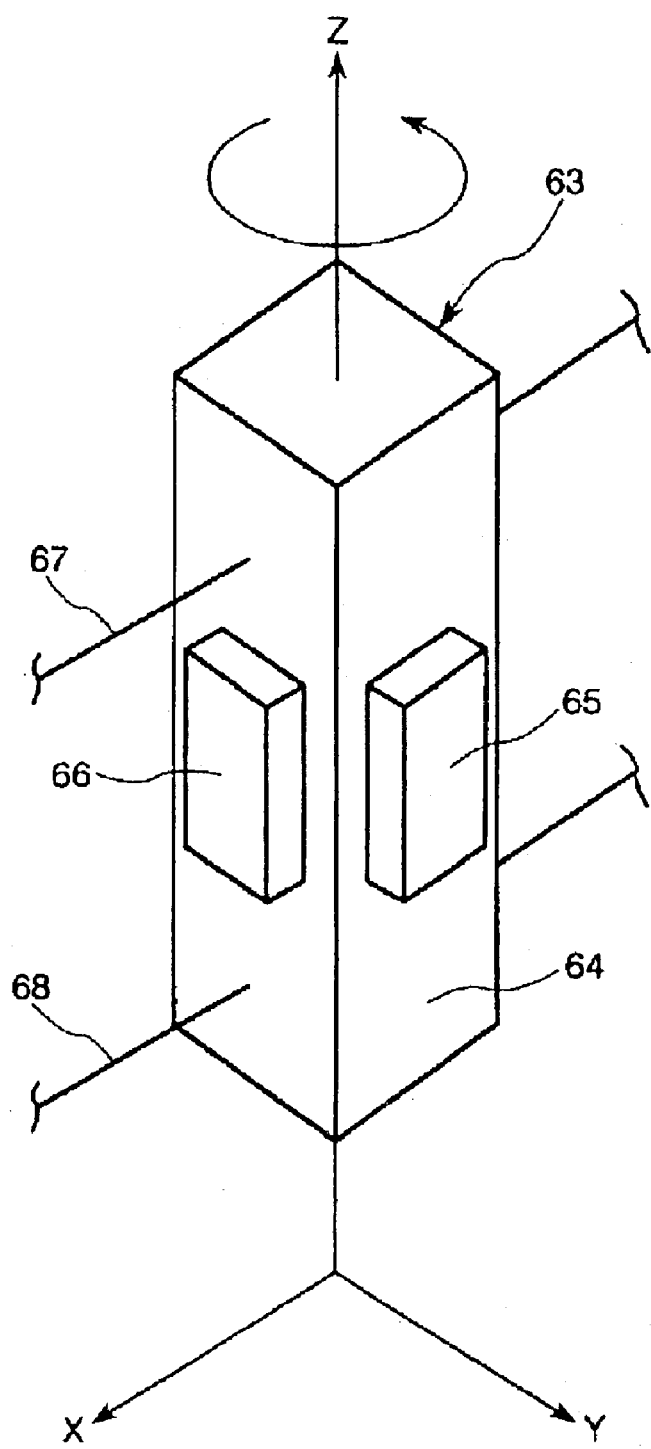
FIG. 18 is an external view of a configuration of the Z-direction detecting sensor of the position and attitude sensing device shown in FIG. 17.

FIG. 16 is a block diagram illustrating a configuration of the position and attitude sensing device of the tactile and kinesthetic sensation generating device of the fourth embodiment. FIG. 17 is an external view illustrating a configuration of the position and attitude sensing device of the tactile and kinesthetic sensation generating device of the fourth embodiment (partially omitting the drawing). FIG. 18 is an external view illustrating a configuration of the Z-direction detecting sensor of the position and attitude sensing device shown in FIG. 17. The X-, Y- and Z-axes are considered to be orthogonal to each other in FIGS. 17 and 18.

Hereafter, a tactile and kinesthetic sensation generating device 2 and an image processing apparatus 1 of the fourth embodiment will be described concentrating on differences from the first embodiment and omitting the description of the same component.

In the tactile and kinesthetic sensation generating device 2 of the fourth embodiment, a gyro sensor (gyroscope) utilizing Coriolis force to detect the angular velocities about the X-, Y- and Z-axes is used as the position and attitude sensing device (position detecting unit) 23.

As for the tactile and kinesthetic sensation generating device 2, convex/concave detection input parts (image pickup units) 53a and 53b take the image of surrounding objects. When a finger is included in the taken image, the finger position is determined based on the image data (picture data) from the convex/concave detection input parts 53a and 53b, whereas when a finger is not included in the taken image, the finger position is detected by each of the position and attitude sensing devices 23, and the finger position is calculated based on the information obtained from each of the position and attitude sensing devices 23.

As shown in FIG. 17, the position and attitude sensing device 23 has a casing 60, in which is disposed an X-direction detecting sensor (first detecting sensor) 61 for detecting the angular velocity about the X-axis, a Y-direction detecting sensor (second detecting sensor) 62 for detecting the angular velocity about the Y-axis, and a Z-direction detecting sensor (third detecting sensor) 63 for detecting the angular velocity about the Z-axis.

As shown in FIG. 18, the Z-direction detecting sensor 63 is configured of an elinvar (base) 64, a piezoelectric element (vibration piezoelectric element) 65 disposed on the elinvar base 64 for vibration, and a piezoelectric element (detection piezoelectric element) 66 for detection. The Z-direction piezoelectric element 63 is supported by two wires 67 and 68.

The elinvar 64 is substantially rectangular and extended in the Z-axis direction, in which the vibration piezoelectric element 65 is disposed on one of two surfaces orthogonal to each other and the detection piezoelectric element 66 is disposed on the other surface. In this case, the vibration piezoelectric element 65 is disposed on the surface orthogonal to the Y-axis, and the detection piezoelectric element 66 is disposed on the surface orthogonal to the X-axis, but it is acceptable to reverse this arrangement.

When an AC voltage is applied to the vibration piezoelectric element 65 of the Z-direction detecting sensor 63 from an AC power source 69 shown in FIG. 16, the vibration piezoelectric element 65 vibrates (bends and vibrates) in the X-axis direction. Therefore, the elinvar 64 also vibrates in the X-axis direction. At this time, when a rotation (angular velocity) is generated about the Z-axis, a voltage (signal) of a level corresponding to the angular velocity is detected from the detection piezoelectric element 66.

The configurations of the X-direction detecting sensor 61 and the Y-direction detecting sensor 62 are the same as the Z-direction detecting sensor 63, thus the description is omitted. The effect of these is that when a rotation (angular velocity) is generated about the X-axis, a voltage (signal) of the level corresponding to the angular velocity is detected from the detection piezoelectric element 66 of the X-direction detecting sensor 61, and that when a rotation (angular velocity) is generated about the Y-axis, a voltage (signal) of the level corresponding to the angular velocity is detected from the detection piezoelectric element 66 of the Y-direction detecting sensor 62.

As shown in FIG. 16, the signal (detected data) corresponding to the angular velocity about the X-axis detected by the X-direction detecting sensor 61, the signal (detected data) corresponding to the angular velocity about the Y-axis detected by the direction detecting sensor 62, and the signal (detected data) corresponding to the angular velocity about the Z-axis detected by the Z-direction detecting sensor 63 of the position and attitude sensing device 23 are all amplified by amplifiers 251 of a signal processing device 25. The signals are converted to digital signals in an conversion part 252, outputted to the signal sending and receiving device 26 shown in FIG. 2, and then sent to the information processing device 8 by the signal sending and receiving device 26.

The information processing device 8 receives the signals, derives the position and attitude of each part of the fingers, hand, wrist and arm wearing the real space glove 20, that is, the coordinates of each part based on the signals (information), and stores the information in a predetermined storing area in the storing part 85 for utilizing them in each of the predetermined processes.

Next, the operation (effect) of the image processing apparatus 1 in the fourth embodiment will be described. The operation is the same as the first embodiment except the method for determining the position and attitude of each part of the fingers, hand, wrist and arm wearing the real space glove 20, and thus the same description is omitted.

Prior to use, the user sets the surrounding image taken by the convex/concave detection input parts 53a and 53b to include the part to be detected such as the finger of the real space glove 20 at first. Thus, initial setting is done in the image processing apparatus 1.

In this initial setting, the virtual space display device 5 uses two image pickup devices (image pickup units), that is, the convex/concave detection input parts (image pickup units) 53a and 53b, to take the surrounding image, and sends the taken image data (picture data) to the information processing device 8.

In this case, the image taken by the convex/concave detection input parts 53a and 53b includes the part to be detected such as the finger of the real space glove 20. Therefore, the information processing device 8 determines the position and attitude (coordinates) of the part such as the finger based on the image taken by the convex/concave detection input parts 53a and 53b. The determined position and attitude are the reference position and the reference attitude, that is, the reference state. The information of the reference position and the reference attitude is stored in a predetermined area of the storing part 85 in the information processing device 8.

When the initial setting is finished, operation can begin. The virtual space display device 5 takes the surrounding image with the convex/concave detection input parts (image pickup units) 53a and 53b, and sends the taken image data to the information processing device 8.

The control device 84 (detection unit) of the information processing device 8 determines whether the part to be detected such as the finger of the real space glove 20 is included in the image taken by the convex/concave detection input part 53a and 53b.

Then, when the taken image includes the part to be detected such as the finger, the information processing device 8 determines the position and attitude (coordinates) of the finger based on the taken image data. The determined position and attitude are set to be the reference position and the reference attitude. More specifically, the information of the reference position and the reference attitude stored in the storing part 85 is replaced with the information of the new reference position and the new reference attitude.

On the other hand, when the taken image does not include the part to be detected such as the finger, the information processing device 8 determines the position and attitude (coordinates) of the finger based on the signal (information) from each of the position and attitude sensing devices 23. In this case, the position and attitude relative to the reference position and attitude are determined from the information from each of the position and attitude sensing devices 23. Thus the position and attitude of the finger are determined based on the relative position and attitude, and the reference position and attitude.

According to the tactile and kinesthetic sensation generating device 2 and the image processing apparatus 1, the same advantage as the first embodiment can be obtained.

Moreover, the tactile and kinesthetic sensation generating device 2 can determine the position and attitude of the predetermined part of the hand and each finger accurately and surely. In addition to this, a gyro sensor is used for the position and attitude sensing device 23, thus costs can be reduced.

The position and attitude sensing device (position detecting unit) 23 is configured of the gyro sensor in the embodiment, but the invention is not limited to this.

Furthermore, in this embodiment of the invention, it is acceptable that the unit tactile sense generating sub-device 210 of the tactile sense generating device 21 is configured as in the second embodiment.

Moreover, as for the embodiment, it is acceptable that the arm fixing part 2d uses an air injection system to fix the device to the arm by air pressure (pressing force) as in the third embodiment.

Although not described in detail, the configurations can be applied to the position and attitude sensing device 56 of the virtual space display device 5. Also in this case, the same advantage as the first embodiment can be obtained.

Next, with reference to flowcharts depicted in FIGS. 19 and 20, the operation of the image processing apparatus of the invention will be described based on the configurations of the embodiments, particularly the first embodiment. Programs for implementing each of the functions described in these flowcharts are stored in the recording medium of the storing part 85 in the form of program codes readable by a computer. The control device 84 sequentially executes the operation in accordance with the program codes. In addition, the control device 84 can also sequentially execute the operation in accordance with the program codes received via transmission media as described above. More specifically, the operation characteristic of the embodiments can be executed by utilizing programs/data fed from outside via the transmission media as well as programs stored in recording media.

FIG. 19 is the flowchart illustrating the display image changing process in the image processing apparatus of the invention. FIG. 20 is the flowchart illustrating the display image combination process in the image processing apparatus of the invention. These flowcharts will be described with respect to the components in the first embodiment.

First, the FIG. 19 describes the display image changing process. The image processing apparatus 1 of the invention executes the display image changing process while the power is on, for updating virtual space images or generating a tactile and kinesthetic sensation. The virtual space image is created based on real space images taken by the convex/concave detection input parts 53 of the virtual space display device (HMD) 5. The case of sending and receiving signals and data between the HMD 5 and the information processing device 8 will mainly be described here for convenience of explanation.

In accordance with the order of the control device 54 of the HMD 5, the CCDs 532 of the convex/concave detection input parts 53 take an image in real space seen from the user's point of gaze (Step S101). The taken image data is sent to the information processing device 8 via the signal processing device 58 and the signal sending and receiving device 55 (Step S102).

The information processing device 8 receives the taken image data via the signal sending and receiving device 87 (Step S103). Then, the control device 84 orders the image creating device 83 to create a virtual space image based on the taken image data (Step S104). It stores the taken image data and the created image data in a predetermined storing area of the storing part 85, and sends the created image data to the HMD 5 (Step S105).

The HMD 5 receives the image data via the signal sending and receiving device 55 (Step S106), and then the control device 54 orders the image display devices 51 to display the virtual space image data (Step S107). At this point, the initial image capturing and display are completed.

Subsequently, the HMD 5 detects its position by the position and attitude sensing device 56 (Step S108), and then sends the detected position data to the information processing device 8 via the signal processing device 58 and the signal sending and receiving device 55.

The information processing device 8 receives the detected signal via the signal sending and receiving device 87 (Step S110). Then, the control device 84 of the information processing device 8 determines whether there has been movement of the HMD 5, based on the position of the HMD 5 stored beforehand (initial value) and the present position of the HMD 5 (Step S111). In the case of detecting no movement of the HMD 5, the control device returns to Step S108 and repeats the same process until the movement of the HMD 5 is detected. In the case of detecting the movement of the HMD 5, the calculation device 81 calculates the movement speed of the HMD 5 based on the position change before and after the movement and the required time (Step S112).

As for the calculation method of the movement speed, there are methods of calculation by using the gyro sensor (not shown in FIG. 9) for calculation and by integrating acceleration data obtained from the three-dimensional acceleration sensor 59, as well as the method in which the position data obtained from the position and attitude sensing device 56 of the HMD 5 is used and differentiated. Any methods can be used for operation as long as the movement speed of the HMD 5 can be determined with a certain degree of accuracy.

In Step S113, the control device 84 determines whether the operated movement speed is akm/h or greater (in the embodiment, it is desirably equal to or below the speed that a human walks, for example, 2 km/h). When the movement speed is slower than akm/h, the control device 84 orders the image creating device 83 to create an updated virtual space image based on the movement of the HMD 5 (Step S114), and stores the image data in a predetermined storing area of the storing part 85. On the other hand, when the movement speed is a akm/h or greater, the control device 84 creates control data to display the image (picture) being taken by the CCDs 532 of the HMD 5 as it is on the image display devices 51 (Step S115). In addition, it is acceptable that the control device 84 is configured to read out the taken image data, taken by the CCDs and stored in the storing part 85, and send the taken image data at Step S116, instead of creating the control data at Step S115.

Then, the information processing device 8 sends the updated and created virtual space image data or the control data to the HMD 5 via the signal processing device 86 and the signal sending and receiving device 87 (Step S116).

The HMD 5 receives the virtual or the real space data via the signal sending and receiving device 55 (Step S117), and then allows the image display devices 51 to display the virtual space image or the real space image based on the image data or the control data (Step S118), thereby completing the display image changing process.

As described above, in the display image changing process, while the virtual space image is being displayed on the HMD 5, it is changed to the real space image (picture) for display in the case where the HMD 5, that is, the user is moving at a predetermined speed or greater. Therefore, the user wearing the HMD 5 can recognize obstacles in the real space while moving. Accordingly, the image processing apparatus 1 of the invention can secure the safety of the user wearing the HMD 5 when moving.

Although not shown in the flowchart, it is acceptable that after this, the position of the HMD 5 is similarly detected to calculate the movement speed, and the image display devices 51 are allowed to display the updated virtual space image created by the image creating device 83 when the movement speed becomes slower than akm/h.

In an operation contrasting with that of the flowchart, it is acceptable that the virtual space image is displayed so as to superimpose (overlay and display) a virtual object in the virtual space when the movement speed of the HMD 5 reaches a predetermined value (akm/h) or greater. According to this configuration, a virtual image of furniture placed in the real space can be displayed while moving in an exhibition (show) room of real estate such as a condominium, which gives the user an experience similar to actually living in the condominium.

Next, the FIG. 20 describes the display image combination process. The flow steps, up to the movement of the HMD 5 is detected, are the same as the case of the display image changing process, thus such description is omitted, and the explanation starts from the calculation of the movement speed of the HMD 5, corresponding to Step S112 of the display image changing process.

When the movement of the HMD 5 is detected, the calculation device 81 of the information processing device 8 calculates the movement speed of the HMD 5 based on the position change of the HMD 5 before and after the movement over a required time (Step S201). The calculation method is not limited to this as in the case of the display image changing process.

At Step S202, the control device 84 determines whether the calculated movement speed is $a_1$ km/h (first threshold value, for example, 1 km/h) or greater. When the movement speed is slower than $a_1$ km/h, the control device 84 orders the image creating device 83 to create an updated virtual space image based on the movement of the HMD 5 (Step S203), and stores the image data in a predetermined storing area of the storing part 85.

On the other hand, when the movement speed is $a_1$ km/h or greater, the control device 84 subsequently determines whether the movement speed is equal to or greater than $a_2$ km/h (second threshold value, for example, 6 km/h) at Step S204. When the movement speed is equal to or greater than $a_2$ km/h, the control device 84 creates control data to display the image (picture) being taken by the CCDs 532 of the HMD 5 as it is on the image display devices 51 (Step S205). Similar to the display image changing process, it is acceptable that the taken image data stored in the storing part 85 of the information processing device 8 is read out and the taken image data is sent to the HMD 5 at Step S208.

When the movement speed is slower than $a_2$ km/h, the control device 84 orders the image creating device 83 to create an updated virtual space image based on the movement of the HMD 5 similar to Step S203 (Step S206), and stores the image data in a predetermined storing area of the storing part 85. Then, the control device 84 orders creation of an image combining the image data taken by the CCDs and the updated virtual space image data with considering the ratio of the differences of the calculated movement speed based on the first and second threshold values (Step S207), and stores the resulting image data in a predetermined storing area of the storing part 85. For example, when $a_1=1$, $a_2=6$ respectively, and the movement speed is 4 km/h, the movement speed ratio is 3:2 with respect to the first and second threshold values. Therefore, the updated virtual space image is combined with the image taken by the CCDs with a ratio of 3:2.

Subsequently, the information processing device 8 sends the updated created virtual space image data, the control data or the combined image data to the HMD 5 via the signal processing device 86 and the signal sending and receiving device 87 (Step S208).

The HMD 5 receives the above data via the signal sending and receiving device 55 (Step S209), and displays the virtual space image, the real space image or the combined image on the image display devices 51 based on the updated image data, the control data or the combined image data (Step S210), thereby completing the display image changing process.

When the movement speed of the HMD 5 is between the first and second threshold values, and the position data detected by the position and attitude sensing device 23 of the real space glove 20 match the coordinates of a virtual object displayed in the virtual space, it is acceptable that the tactile sense generating device 21 and the kinesthetic sense generating device 22 of the real space glove 20 generate a tactile and kinesthetic sensation to the user's hand (finger). On the other hand, it is also acceptable that the virtual object in the virtual space is merely displayed and a tactile and kinesthetic sensation are not generated even though the coordinates of the finger of the real space glove 20 match the coordinates of the object. In this manner, configuration modes can be changed, and thus the adaptability to the user wishing to grab the virtual object even while moving can be increased.

As described above, in the display image combination process, while the virtual space image is being displayed in the HMD 5, the image to be displayed on the HMD 5 is changed as follows: the virtual space image is displayed when the HMD 5, that is, the user moves at a speed slower than the first threshold value; the image combining the virtual space image with the real space image is displayed when the user is moving at a speed between the first and second threshold values; and the real space image is displayed when moving at a speed greater than the second threshold value. Therefore, the user wearing the HMD 5 can see the obstacles in the real space as well as recognizing a virtual object while moving. Thus, the image processing apparatus 1 of the invention can secure the safety of the user wearing the HMD 5 while moving, and also improve adaptability to the user's actions.

The display image combination process has been configured so that the virtual space image is simply combined with the real space image when the movement speed of the HMD 5 is between the first and second threshold values. However, it is acceptable that only the virtual object in the virtual space image is superimposed (superposed) on the real space image. Accordingly, the user can easily determine whether it is the virtual object or the real obstacle, and the safety during movement is increased.

As described above, the configuration of the image processing apparatus of the invention has been described in accordance with the embodiments shown in the drawings. However, the invention is not limited to these, and the configuration of each part can be replaced by an arbitrary configuration having the same functions.

Furthermore, in the invention, it is acceptable that two or more of arbitrary configurations (features) of the embodiments are properly combined. Moreover, the display image changing process and the display image combining process of the invention are different modes, and an embodiment may be configured to switch the process mode to be executed.

In the display image combination process of the invention, two threshold values are used to decide the combination ratio of the virtual space image to the real space image. However, the invention is not limited to this. For example, it is acceptable that the combination ratio and the range of application are specified beforehand so that four threshold values are used to set the ratio of the virtual space image to the real space image, such as 2:1 when between the first and second threshold values, 1:1 when between the second and third threshold values, and 1:2 when between the third and fourth threshold values.

Additionally, it is acceptable that the image processing apparatus 1 of the invention is configured so that the user can set each of the threshold values a, $a_1$ and $a_2$ for the display image changing process and the display image combination process.

As described above, according to the invention, when the user moves in the virtual space, the virtual space image and the real space image can be changed or combined for display based on the movement speed of the user's point of gaze. Thus, the user can recognize the obstacles in the real space while the user is moving, which can realize the unique advantage that the safety during movement can be secured.

The entire disclosure of Japanese Patent Application No. 2002-143906 filed May 17, 2002 is incorporated by reference.

What is claimed is:

1. An image processing apparatus comprising:
   an image pickup unit adapted to take an image in real space seen from a user's point of gaze;
   an image creating unit adapted to create an image in virtual space corresponding to the real space image taken by the image pickup unit;
   a display unit adapted to be able to display the real space image taken by the image pickup unit and the virtual space image created by the image creating unit;
   a speed detecting unit adapted to detect the speed of movement of the user's point of gaze; and
   a display control unit adapted to change at least a part of an image to be displayed on the display unit from one of the real space image and the virtual space image to the other, based on the movement speed detected by the speed detecting unit.

2. The image processing apparatus according to claim 1, wherein the display control unit changes the image to be displayed from the real space image to the virtual space image or from the virtual space image to the real space image when the movement speed detected by the speed detecting unit is greater than a predetermined value.

3. An image processing apparatus comprising:
   an image pickup unit adapted to take an image in real space seen from a user's point of gaze;
   an image creating unit adapted to create an image in virtual space corresponding to the real space image taken by the image pickup unit;
   a display unit adapted to be able to display the real space image taken by the image pickup unit and the virtual space image created by the image creating unit;
   a speed detecting unit adapted to detect the speed of movement of the user's point of gaze; and
   a display control unit adapted to change the display ratio of the real space image and the virtual space image based on the movement speed detected by the speed detecting unit and combine these images for display.

4. The image processing apparatus according to claim 3, wherein the display control unit causes the display unit to display the virtual space image when the movement speed detected by the speed detecting unit is slower than a first threshold value, the display control unit makes the display unit to display the real space image when the movement speed is greater than a second threshold value, and the display control unit changes the ratio of the real space image and the virtual space image based on the movement speed, combines these images, and causes the display unit to display the combined image when the movement speed is between the first threshold value and the second threshold value.

5. The image processing apparatus according to claim 3 further comprising:
   a finger position detecting unit adapted to detect a finger position; and
   a tactile and kinesthetic sensation presenting unit having a tactile and kinesthetic sensation generating unit adapted to give a tactile and kinesthetic sensation to a finger when the finger position detected by the finger position detecting unit matches the position of a virtual object displayed in the virtual space image, wherein the image creating unit creates a virtual finger image at the position of the finger detected by the finger position detecting unit in the virtual space, and the display unit displays the virtual space image including the virtual finger image.

6. The image processing apparatus according to claim 4 further comprising:

a finger position detecting unit adapted to detect a finger position;

a tactile and kinesthetic sensation presenting unit having a tactile and kinesthetic sensation generating unit adapted to give a tactile and kinesthetic sensation to a finger when the finger position detected by the finger position detecting unit matches the position of a virtual object displayed in the virtual space; and a drive control unit adapted to control activation of the tactile and kinesthetic sensation generating unit so that a finger pad receives a sensation corresponding to contact when the finger position detected by the finger position detecting unit matches the position of the virtual object displayed in the virtual space image in the case where the movement speed is between the first threshold value and the second threshold value, wherein the image creating unit creates a virtual finger image at the position of the finger detected by the finger position detecting unit in the virtual space, and the display unit displays the virtual space image including the virtual finger image.

7. The image processing apparatus according to claim 4 further comprising:

a finger position detecting unit adapted to detect a finger position;

a tactile and kinesthetic sensation presenting unit having a tactile and kinesthetic sensation generating unit adapted to generate a tactile and kinesthetic sensation given to a finger when the finger position detected by the finger position detecting unit matches the position of a virtual object displayed in the virtual space; and a drive control unit adapted to control the tactile and kinesthetic sensation generating unit so that a finger pad cannot receive a sensation corresponding to a contact even when the finger position detected by the finger position detecting unit matches the position of the virtual object displayed in the virtual space, in the case where the movement speed is between the first threshold value and the second threshold value, wherein the image creating unit creates a virtual finger image at the finger position detected by the finger position detecting unit in the virtual space, and the display unit displays the virtual space image including the virtual finger image.

8. The image processing apparatus according to claim 3, wherein the image pickup unit has two CCD cameras corresponding to the user's point of gaze.

9. The image processing apparatus according to claim 3, wherein the image creating unit updates and creates the virtual space image at predetermined time intervals based on the speed of the user's point of gaze detected by the speed detecting unit.

10. The image processing apparatus according to claim 3, wherein the display unit has a position detecting unit adapted to detect the position of the user's point of gaze, and the speed detecting unit includes an operating unit adapted to calculate the speed of the user's point of gaze from the positions of the user's point of gaze detected by the position detecting unit and the time required to move between positions.

11. The image processing apparatus according to claim 10, wherein the position detecting unit is a position detecting unit of an orthogonal coil system having a first coil, a second coil and a third coil, and their central axes are orthogonal to each other.

12. The image processing apparatus according to claim 10, wherein the finger position detecting unit has gyro sensors for detecting an angular velocity about X-, Y- and Z-axes orthogonal to each other.

13. The image processing apparatus according to claim 3, wherein the speed detecting unit comprises:

a three-dimensional acceleration sensor for sensing an acceleration in three directions orthogonal to each other, and an operating unit adapted to calculate speed by at least one of integrating and adding the output of the acceleration sensor.

14. The image processing apparatus according to claim 3, wherein the display unit is a product to be worn on a face for use.

15. The image processing apparatus according to claim 3, wherein the display unit and the image pickup unit are configured as one unit, which further comprises:

at least one of: an image creating unit; a speed detecting unit; a display control unit; and a drive control unit; and a communication unit adapted to send and receive at least one of real image data, virtual space image data, position data, and drive control data.

16. The image processing apparatus according to claim 3 further comprising a storing unit adapted to store at least one of the real space image data taken by the image pickup unit, virtual space image data created by the image creating unit, movement speed detected by the speed detecting unit, and position data detected by the position detecting unit.

17. An image processing method comprising the steps of:

taking an image in real space seen from a user's point of gaze;

creating a virtual space image corresponding to the taken real space image;

displaying at least one of the taken real space image and the created virtual space image;

detecting the speed of the user's point of gaze; and changing at least a part of the image to be displayed from one of real space image and virtual space image to the other for display, based on the detected movement speed.

18. The image processing method according to claim 17, wherein the changing and displaying step changes the image to be displayed from the real space image to the virtual space image or from the virtual space image to the real space image when the detected movement speed is greater than a predetermined value.

19. An image processing method comprising the steps of:

taking an image in real space seen from a user's point of gaze;

creating a virtual space image corresponding to the taken real space image;

displaying at least one of the taken real space images and the created virtual space image;

detecting the speed of the user's point of gaze; and changing the ratio of the real space image and the virtual space image and combining them for display, based on the detected movement speed.

20. The image processing method according to claim 19, wherein the combining and displaying step causes the virtual space image to be displayed when the movement speed of the user's point of gaze is smaller than a first threshold value, causes the real space image to be displayed when the movement speed is greater than a second threshold value, and determines a ratio of the real space image and the virtual space image based on the movement speed and combines them for display when the movement speed is between the first threshold value and the second threshold value.

21. The image processing method according to claim 19 further comprising the steps of:
    detecting the finger position to display a finger image in the virtual space image, and
    generating a tactile and kinesthetic sensation given to a finger when the detected finger position matches the position of a virtual object displayed in the virtual space image.

22. The image processing method according to claim 20 further comprising the steps of:
    detecting a finger position to display a finger image in the virtual space image,
    generating a tactile and kinesthetic sensation given to the finger when the detected finger position matches the position of a virtual object displayed in the virtual space image, and
    controlling the generation of the tactile sense and the kinesthetic sense so that a finger pad receives a sensation corresponding to the degree of contact of the detected finger position with the position of the virtual object displayed in the virtual space image in the case where the movement speed is between the first threshold value and the second threshold value.

23. The image processing method according to claim 20, further comprising the steps of:
    detecting a finger position and displaying an image of the finger in the virtual space image;
    generating a tactile and kinesthetic sensation given to a finger when the detected finger position matches the position of a virtual object displayed in the virtual space image; and
    controlling the generation of the tactile sense and the kinesthetic sense so that even when the detected finger position matches the position of the virtual object displayed in the virtual space image, the finger pad can not receive a sensation corresponding to the degree of contact in the case where the movement speed is between the first threshold value and the second threshold value.

24. The image processing method according to claim 19 further comprising the step of detecting the position of the user's point of gaze before the speed detecting step,
    wherein the speed detecting step includes the step of calculating the speed of the user's point of gaze based on the different detected positions of the user's point of gaze and the time required to move between the different positions.

25. The image processing method according to claim 19, wherein the speed detecting step includes the step of detecting an acceleration of the user's point of gaze and at least one of integrating and adding the acceleration to calculate the speed.

26. An image processing program for an information processing device for creating a virtual space image and displaying the virtual space image to be visually recognized by a user, the program making a computer of the information processing device to function as:
    image pickup means for taking an image in real space seen from a user's point of gaze;
    image creating means for creating a virtual space image corresponding to the real space image taken by the image pickup means;
    display means for displaying the real space image taken by the image pickup means and the virtual space image created by the image creating means;
    speed detecting means for detecting the speed of the user's point of gaze; and
    display controlling means for changing at least a part of the image to be displayed on the displaying means from one of the real space image and the virtual space image to the other, based on the movement speed detected by the speed detecting means.

27. The image processing program according to claim 26, wherein the display controlling means includes a program code ordering change of the image to be displayed from the real space image to the virtual space image or from the virtual space image to the real space image when the movement speed detected by the speed detecting means is greater than a predetermined value.

28. An image processing program for an information processing device for creating a virtual space image and displaying the virtual space image so as to be visually recognizable by a user, the program making a computer of the information processing device to function as:
    image pickup means for taking an image in real space seen from a user's point of gaze;
    image creating means for creating a virtual space image corresponding to the real space image taken by the image pickup means;
    display means for displaying the real space image taken by the image pickup means and the virtual space image created by the image creating means;
    speed detecting means for detecting the speed of the user's point of gaze; and
    display controlling means for changing the display ratio of the real space image and the virtual space image based on the movement speed detected by the speed detecting means and combining them for display.

29. The image processing program according to claim 28, wherein the display controlling means includes a program code making the displaying means to display the virtual space image when the movement speed detected by the speed detecting means is slower than a first threshold value, making the displaying means to display the real space image when the movement speed is greater than a second threshold value, and determining the ratio of the real space image and the virtual space image to be displayed based on the movement speed when the movement speed is between the first threshold value and the second threshold value, combining these images, and making the displaying means to display the combined image.

30. The image processing program according to claim 28 further comprising a program code for making the computer of the information processing device to function as:
    finger position detecting means for detecting a finger position;
    finger displaying means for displaying a finger image at the finger position detected by the finger position detecting means in the virtual space; and tactile and kinesthetic sensation generating means for generating a tactile and kinesthetic sensation in a finger when the finger position detected by the finger position detecting means matches the position of a virtual object displayed in the virtual space image.

31. The image processing program according to claim 29 further comprising a program code making the computer of the information processing device to function as:
- finger position detecting means for detecting a finger position;
- finger displaying means for displaying a finger image at the finger position detected by the finger position detecting means in the virtual space image;
- tactile and kinesthetic sensation generating means for generating a tactile and kinesthetic sensation given to a finger when the finger position detected by the finger position detecting means matches a position of a virtual object displayed in the virtual space image; and
- drive controlling means for controlling the generation of the tactile sense and the kinesthetic sense so that a finger pad can receive a sensation corresponding to a contact when the finger position detected by the finger position detecting means matches the position of the virtual object displayed in the virtual space image in the case where the movement speed is between the first threshold value and the second threshold value.

32. The image processing program according to claim 29 further comprising a program code making the computer of the information processing device to function as:
- finger position detecting means for detecting a finger position;
- finger displaying means for displaying a finger image at the finger position detected by the finger position detecting means in the virtual space;
- tactile and kinesthetic sensation generating means for generating a tactile and kinesthetic sensation in a finger when the finger position detected by the finger position detecting means matches the position of a virtual object displayed in the virtual space; and
- drive controlling means for controlling the generation of the tactile sense and the kinesthetic sense so that even when the detected finger position matches the position of the virtual object displayed in the virtual space image, the finger pad can not receive a sensation corresponding to the degree of contact in the case where the movement speed is between the first threshold value and the second threshold value.

33. The image processing program according to claim 28, further comprising a program code making the computer of the information processing device to function as position detecting means for detecting the position of the user's point of gaze,
wherein the speed detecting means includes a program code for calculating the speed of the user's point of gaze based on the different positions of the user's point of gaze detected by the position detecting means and the time required to move between these different positions.

34. The image processing program according to claim 28, wherein the speed detecting means includes a program code to detect the acceleration of the user's point of gaze and at least one of integrate and add the acceleration for calculating the speed.

35. A recording medium recording the image processing program according to claim 28 for allowing a computer to execute the program, the recording medium being readable by the computer.

* * * * *